United States Patent
Zhu

(10) Patent No.: US 12,309,732 B2
(45) Date of Patent: May 20, 2025

(54) TIMING ADVANCE INDICATION METHOD AND UPLINK SIGNAL SENDING METHOD

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 407 days.

(21) Appl. No.: 18/011,812

(22) PCT Filed: Jul. 16, 2020

(86) PCT No.: PCT/CN2020/102497
§ 371 (c)(1),
(2) Date: Dec. 20, 2022

(87) PCT Pub. No.: WO2022/011654
PCT Pub. Date: Jan. 20, 2022

(65) Prior Publication Data
US 2023/0254799 A1  Aug. 10, 2023

(51) Int. Cl.
*H04W 56/00* (2009.01)
*H04W 84/06* (2009.01)

(52) U.S. Cl.
CPC ....... *H04W 56/005* (2013.01); *H04W 56/009* (2013.01); *H04W 84/06* (2013.01)

(58) Field of Classification Search
CPC . H04W 56/005; H04W 56/009; H04W 84/06; H04W 56/0045; H04W 56/00; H04B 7/185
See application file for complete search history.

(56) References Cited

U.S. PATENT DOCUMENTS

2020/0153500 A1  5/2020  Kim et al.
2022/0022152 A1* 1/2022  Liu .................. H04W 56/0015
(Continued)

FOREIGN PATENT DOCUMENTS

CN       107528628 A      12/2017
CN       110876188 A      3/2020

OTHER PUBLICATIONS

International Search Report of PCT/CN2020/102497 dated Apr. 19, 2021, (4p).
(Continued)

*Primary Examiner* — Ashley Shivers
(74) *Attorney, Agent, or Firm* — Arch & Lake LLP; Hao Tan; Shen Wang

(57) ABSTRACT

A timing advance indication method is provided. The method may be applied to a space network device in a non-terrestrial network. The space network device determines a first round-trip transmission delay from the space network device to a terminal, and a first distance from the space network device to a ground reference point. The space network device determines a second round-trip transmission delay according to the first distance and a transmission speed of a signal between the space network device and the terminal. The space network device determines an initial timing advance according to a difference between the first round-trip transmission delay and the second round-trip transmission delay. The space network device sends the initial timing advance to the terminal.

20 Claims, 18 Drawing Sheets

(56) References Cited

U.S. PATENT DOCUMENTS

2022/0150858 A1* 5/2022 Ren ................. H04B 7/18589
2023/0131188 A1* 4/2023 Hu .................. H04B 7/06964
                                                              370/329

OTHER PUBLICATIONS

Nokia et al., "Doppler Compensation, Uplink Timing Advance, Random Access and UE Location in NTN", 3GPP TSG RAN WG1 Meeting #98bis, R1-1911220, Chongqing, China, Oct. 20, 2019, (30p).

* cited by examiner

TIMING ADVANCE INDICATION METHOD AND UPLINK SIGNAL SENDING METHOD

CROSS-REFERENCE TO RELATED APPLICATION

This application is a national phase entry under 35 USC § 371 of International Patent Application No. PCT/CN2020/102497, filed on Jul. 16, 2020, the entire disclosure of which is incorporated herein by reference for all purposes.

FIELD

The present disclosure relates to the field of communication technologies, and in particular, to a timing advance indication method, a timing advance indication apparatus, an uplink signal sending method, an uplink signal sending apparatus, an electronic device, and a computer-readable storage medium.

BACKGROUND

With the formal commercialization of 5G technology, research on 6G technology has been put on the agenda. In 6G, terminals at any location on the ground need to be able to communicate. However, because base stations in the current network are located on the ground, there are many restrictions on providing base stations, and it is difficult to cover the ground through ground base stations. Therefore, it is considered to incorporate satellites for coverage.

In a terrestrial network, a base station can send a timing advance (abbreviated as TA) to a terminal, so that an uplink signal frame sent by the terminal corresponds to a downlink signal frame sent by the base station. The base station can also send a timing advance adjustment command to the terminal.

However, when a non-terrestrial network (abbreviated as NTN) is used for communication with a satellite, since the satellite is in the air and moves at high speed, there is a large delay when the base station communicates with the terminal through the satellite. The timing advance is set according to the delay, so the timing advance is larger, and a signaling overhead is also larger when sending a larger timing advance. In addition, a high-speed movement of the satellite can also cause rapid changes in the timing advance.

SUMMARY

According to a first aspect of the present disclosure, a timing advance indication method is provided, which is applied to a space network device in a non-terrestrial network. The method includes determining a first round-trip transmission delay from the space network device to a terminal, and a first distance from the space network device to a ground reference point; determining a second round-trip transmission delay according to the first distance and a transmission speed of a signal between the space network device and the terminal; determining an initial timing advance according to a difference between the first round-trip transmission delay and the second round-trip transmission delay; and sending the initial timing advance to the terminal.

According to a second aspect of the present disclosure, an uplink signal sending method is provided, which is applied to a terminal in a non-terrestrial network. The method includes receiving an initial timing advance sent by a space network device in the non-terrestrial network, in which the initial timing advance is determined based on a first round-trip transmission delay from the space network device to the terminal, a second round-trip transmission delay from the space network device to a ground reference point, and a transmission speed of a signal between the space network device and the terminal; and sending an uplink signal frame to the space network device according to the initial timing advance.

According to a third aspect of the present disclosure, an electronic device is provided, including a processor; and a memory for storing instructions executable by the processor; in which the processor is configured to implement the timing advance indication method described in any of the above-mentioned embodiments, and/or the uplink signal sending method described in any of the above-mentioned embodiments.

According to a fourth aspect of the present disclosure, a computer-readable storage medium is provided, the computer-readable storage medium having stored therein a computer program that, when executed by a processor, causes the processor to implement steps of the timing advance indication method described in any of the above-mentioned embodiments, and/or steps of the uplink signal sending method described in any of the above-mentioned embodiments.

BRIEF DESCRIPTION OF THE DRAWINGS

In order to illustrate the technical solutions in the embodiments of the present disclosure more clearly, the following briefly introduces the accompanying drawings used in the description of the embodiments. Apparently, the accompanying drawings in the following description are only some embodiments of the present disclosure. For those skilled in the art, other accompanying drawings can also be obtained from these accompanying drawings without creative efforts.

DETAILED DESCRIPTION

The technical solutions in embodiments of the present disclosure will be clearly and completely described below with reference to the accompanying drawings in the embodiments of the present disclosure. Apparently, the described embodiments are only some of the embodiments of the present disclosure, but not all of the embodiments. Based on the embodiments in the present disclosure, all other embodiments obtained by those of ordinary skill in the art without creative efforts shall fall within the protection scope of the present disclosure.

In view of this, embodiments of the present disclosure propose a timing advance indication method, a timing advance indication apparatus, an uplink signal sending method, an uplink signal sending apparatus, an electronic device, and a computer-readable storage medium to solve technical problems in the related art.

Figure 1:
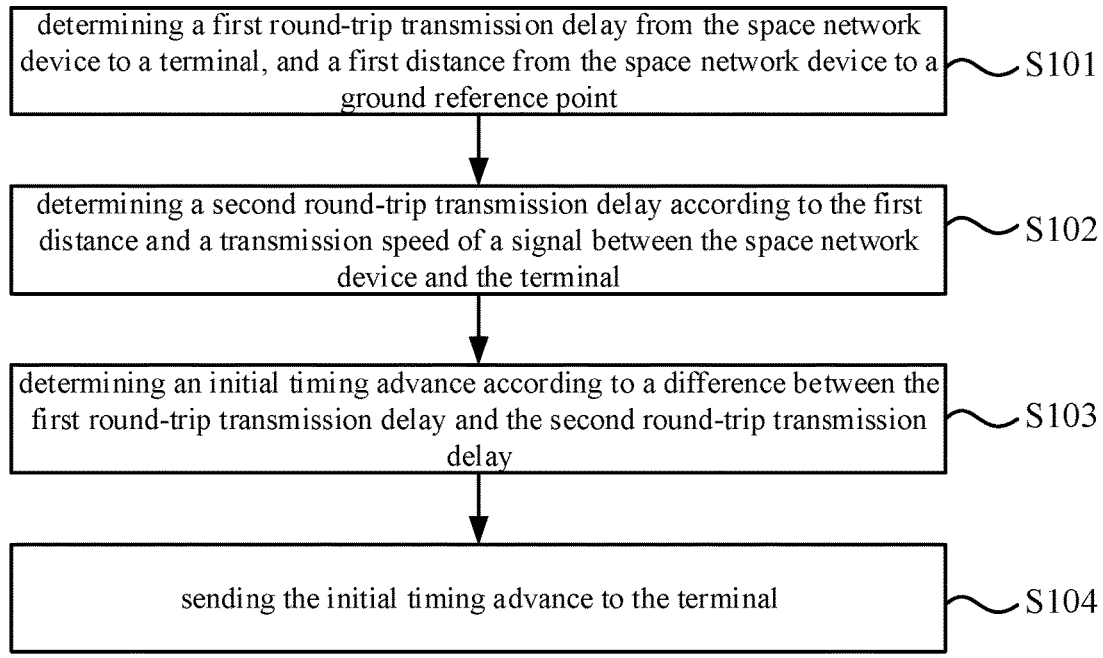
FIG. 1 is a schematic flowchart showing a timing advance indication method according to one or more embodiments of the present disclosure.

FIG. 1 is a schematic flowchart showing a timing advance indication method according to one or more embodiments of the present disclosure. The example method shown in the embodiment may be applied to a space network device in a non-terrestrial network (also referred to as a non-terrestrial network device), where the space network device may be a satellite or an aerial platform. The space network device can communicate with a terminal and a base station, for example, can send information from the base station to the terminal. The terminal includes, but is not limited to, an electronic device, such as a mobile phone, a tablet computer, a wearable device, a sensor, and an Internet of Things device. The base station may be a 5G base station, or a 6G base station.

As shown in FIG. 1, the advance indication method may include the following steps.

In step S101, a first round-trip transmission delay from the space network device to a terminal, and a first distance from the space network device to a ground reference point are determined.

In step S102, a second round-trip transmission delay is determined according to the first distance and a transmission speed of a signal between the space network device and the terminal.

In step S103, an initial timing advance is determined according to a difference between the first round-trip transmission delay and the second round-trip transmission delay.

In step S104, the initial timing advance is sent to the terminal.

In an embodiment, a signal from the terminal may be received by the space network device, and the first round-trip transmission delay is determined according to a difference between a receiving time of the received signal and a sending time of the signal (for example, it may be carried in the signal). It is also possible to determine a distance from the space network device to the terminal firstly, and then the first round-trip transmission delay is determined according to a quotient of the distance and the transmission speed of the signal (for example, a speed of light).

The space network device can determine the first distance to the ground reference point, in which the ground reference point is a point at a known location of the space network device on the ground, for example, it may be a projection point of the space network device on the ground, or it may be a point pre-stored in the space network device. Furthermore, the space network device can determine the second round-trip transmission delay according to the first distance and the transmission speed of the signal between the space network device and the terminal. Then, the initial timing advance is determined according to the difference between the first round-trip transmission delay and the second round-trip transmission delay, and then the initial timing advance is sent to the terminal.

For example, the distance from the space network device to the terminal is $d_{ue}$, the first distance is $d_1$, and the transmission speed of the signal is c, then the initial timing advance ue_TA=$2(d_{ue}-d_1)/c$.

Figure 2:
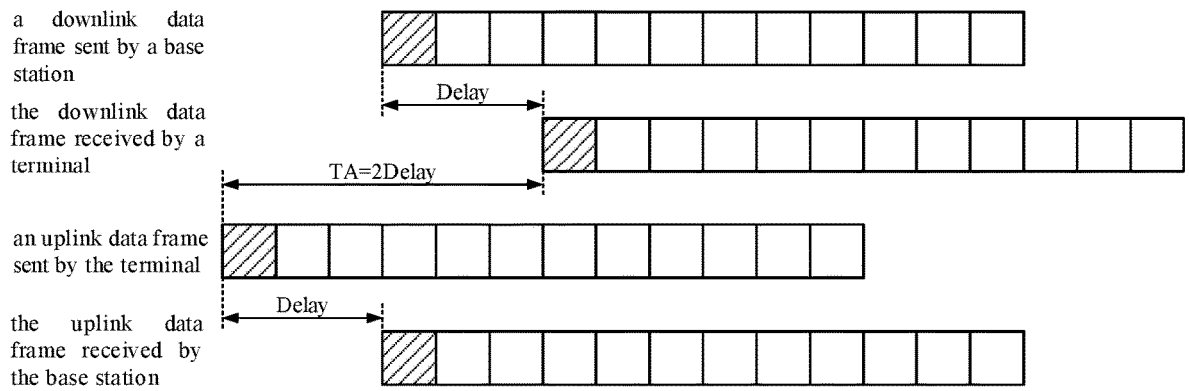
FIG. 2 is a schematic diagram showing an initial timing advance in the related art.
Figure 3:
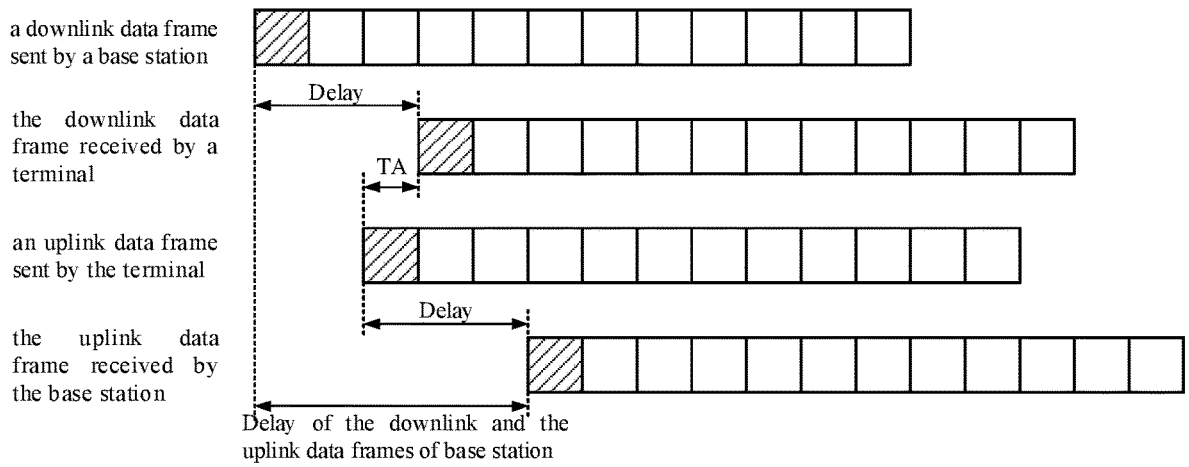
FIG. 3 is a schematic diagram showing an initial timing advance according to one or more embodiments of the present disclosure.

FIG. 2 is a schematic diagram showing an initial timing advance in the related art. FIG. 3 is a schematic diagram showing an initial timing advance according to one or more embodiments of the present disclosure.

As shown in FIG. 2 and FIG. 3, a grid represents a signal frame, and filled grids represent corresponding signal frames, such as signal frames with the same serial number.

As shown in FIG. 2, in the related art, an existing delay from a time when a base station sends a downlink signal frame to a time when a terminal receives the downlink signal frame is a Delay. In order to make an uplink signal frame received by the base station correspond to the downlink signal frame sent by the base station after the uplink signal frame is sent by the terminal, an initial timing advance (TA) indicated by the base station to the terminal is twice the Delay. Therefore, a delay from a time when the terminal sends the uplink signal frame to the base station to a time when the base station receives the uplink signal frame is also the Delay, but the uplink signal frame is sent by the terminal to the base station with twice the Delay in advance, so that the uplink signal frame received by the base station corresponds to the downlink signal frame sent by the base station, and the number of occupied bits required to indicate the TA is determined according to twice the Delay.

However, in a non-terrestrial network, the above Delay is relatively large. For example, in a terrestrial network, the Delay is about 1 millisecond, generally less than 1 millisecond, while in the non-terrestrial network, the Delay may be approximately understood as the first round-trip transmission delay from the space network device to the terminal, such as $d_{ue}/c$, which can reach tens of milliseconds or even hundreds of milliseconds, so the number of occupied bits required to indicate the TA will increase sharply, resulting in a large signaling overhead.

According to the embodiments of the present disclosure, the initial timing advance indicated to the terminal is not only determined according to the first round-trip transmission delay from the space network device to the terminal, but may be determined according to the difference between the first round-trip transmission delay and the second round-trip transmission delay. The difference is smaller relative to the first round-trip transmission delay, and therefore the number of bits which need to be occupied is also smaller, so that the number of occupied bits required to indicate the initial timing advance is also smaller, thus facilitating the saving on signaling overheads.

It should be noted that, because the initial timing advance in the embodiment is different from the related art, it is not equal to twice the Delay, so the delay from a time when the terminal sends the uplink signal frame to the base station to a time when the base station receives the uplink signal frame is not the Delay, and the delay from a time when the base station sends the downlink signal frame to a time when the base station receives the uplink signal frame may be as shown in FIG. 3, which is the delay of the downlink and uplink signal frames of the base station, abbreviated as common_TA. In order to ensure that the sent downlink signal frame corresponds to the received uplink signal frame, the base station needs to receive the uplink signal frame sent by the terminal at a time domain position of the common_TA after sending the downlink signal frame. According to FIG. 3, the common_TA may be understood as twice the Delay minus the initial timing advance in the embodiment. The manner in which the common_TA is determined is described in subsequent embodiments.

Figure 4:
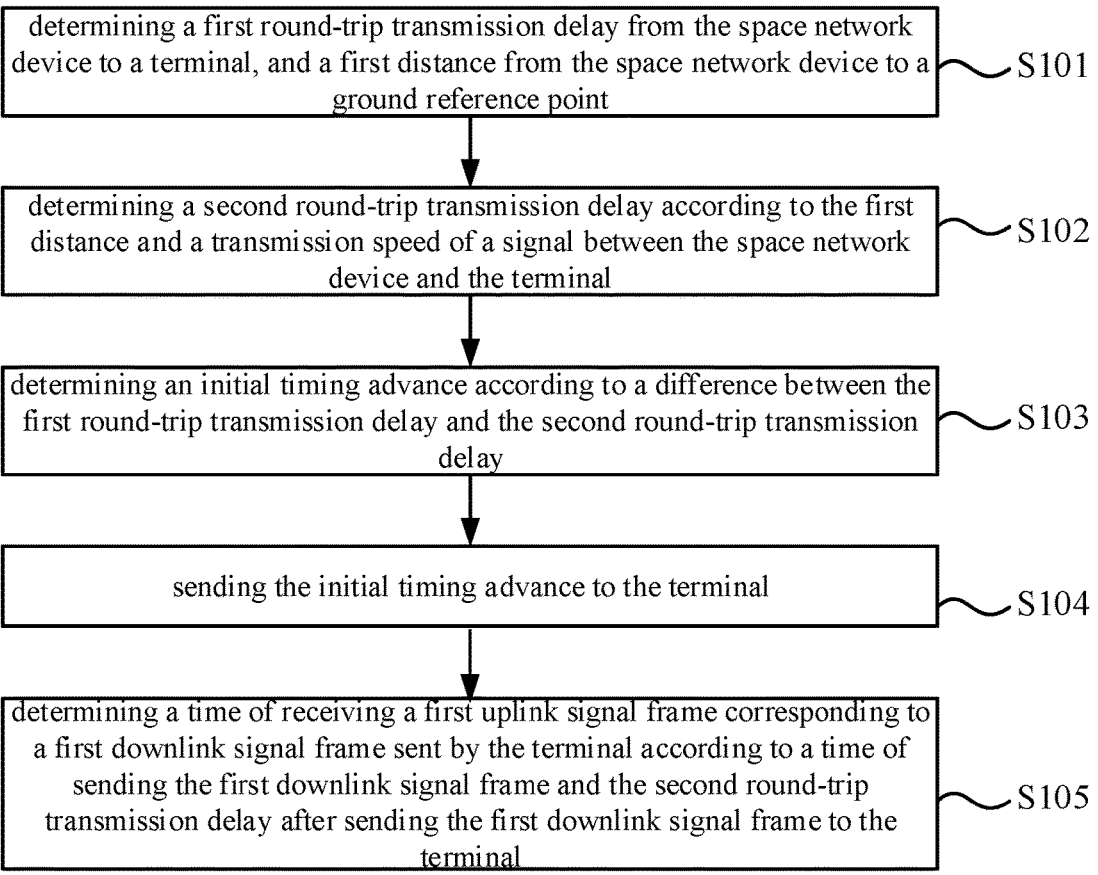
FIG. 4 is a schematic flowchart showing another timing advance indication method according to one or more embodiments of the present disclosure.

FIG. 4 is a schematic flowchart showing another timing advance indication method according to one or more embodiments of the present disclosure. As shown in FIG. 4, the space network device is configured to implement a function of a base station in the non-terrestrial network. For example, if the space network device is a satellite, this situation may be called on-satellite signal regeneration. The method further includes as follows.

In step S105, a time of receiving a first uplink signal frame corresponding to a first downlink signal frame sent by the terminal is determined according to a time of sending the first downlink signal frame and the second round-trip transmission delay after sending the first downlink signal frame to the terminal.

In an embodiment, when the space network device is configured to implement the function of the base station in the non-terrestrial network, the space network device is equivalent to the base station directly communicating with the terminal, and then the Delay of communication between the terminal and the base station is equal to the delay of communication between the terminal and the space network device, that is, the first round-trip transmission delay.

According to the above-mentioned embodiment, the common_TA may be understood as twice the Delay minus the initial timing advance in the embodiment, so twice the Delay is the first round-trip transmission delay, and the common_TA is equal to the first round-trip transmission delay minus the initial timing advance, that is:

$$\text{common\_}TA = 2d_{ue}/c - 2(d_{ue}-d_i)/c = 2d_1/c_o$$

Then, after sending the first downlink signal frame to the terminal, the base station waits for the second round-trip transmission delay $2d_1/c$ in the time domain, and then the received first uplink signal frame sent by the terminal corresponds to the first downlink signal frame.

Figure 5:
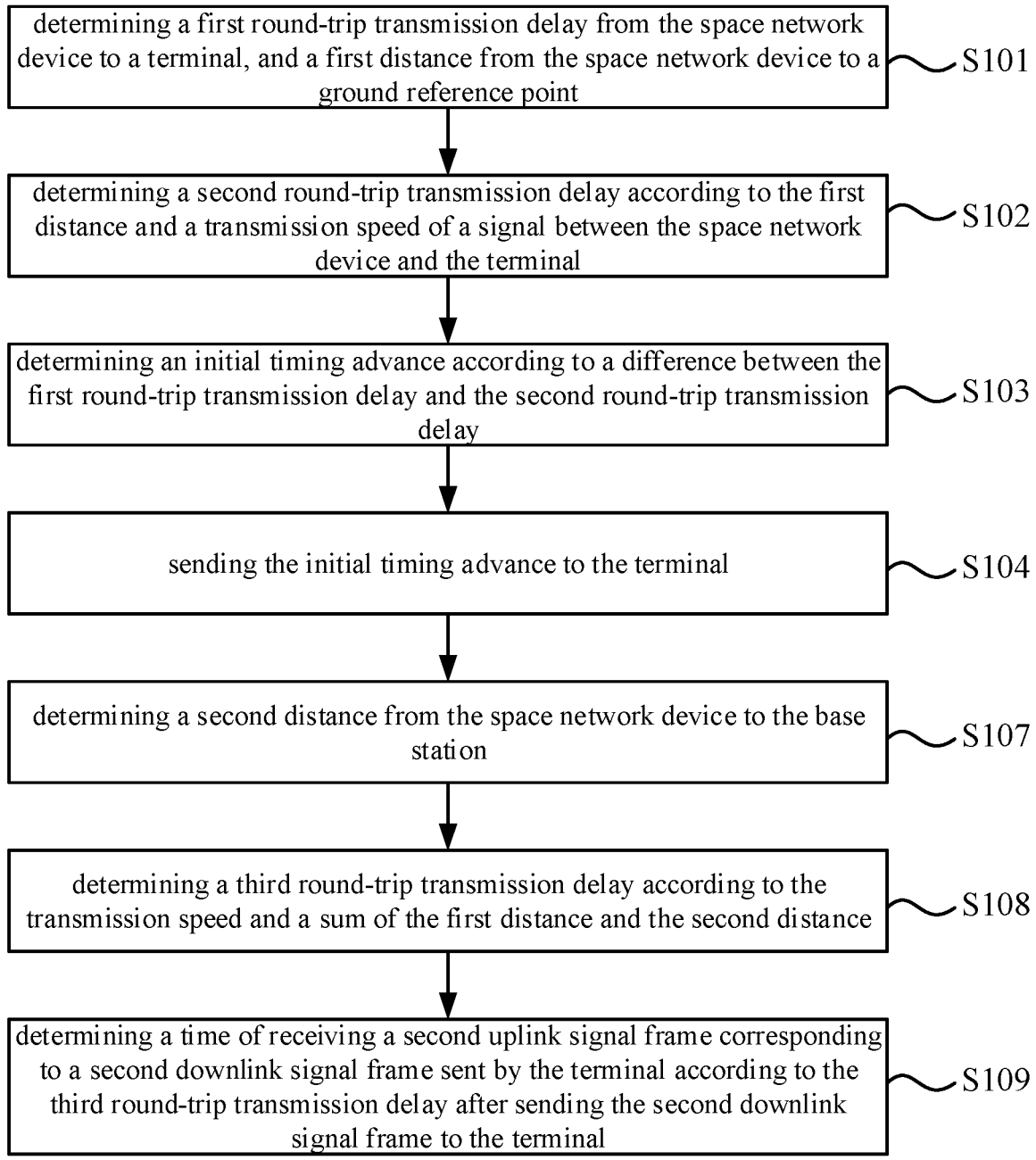
FIG. 5 is a schematic flowchart showing yet another timing advance indication method according to one or more embodiments of the present disclosure.

FIG. 5 is a schematic flowchart showing yet another timing advance indication method according to one or more embodiments of the present disclosure. As shown in FIG. 5, the space network device is configured to transmit information sent by a base station in the non-terrestrial network to the terminal, and the method further includes as follows.

In step S106, a second distance from the space network device to the base station is determined.

In step S107, a third round-trip transmission delay is determined according to the transmission speed and a sum of the first distance and the second distance.

In step S108, a time of receiving a second uplink signal frame corresponding to a second downlink signal frame sent by the terminal is determined according to the third round-trip transmission delay after sending the second downlink signal frame to the terminal.

In an embodiment, when the space network device is configured to transmit information sent by the base station in the non-terrestrial network to the terminal, the communication between the base station and the terminal needs to be transmitted through the space network device. For example, the space network device only plays the role of transparent transmission, but does not process interactive information between the base station and the terminal (but may be amplified in an analog domain), or the space network device processes the interactive information between the base station and the terminal, but does not play all functions of the base station. Since the communication between the base station and the terminal needs to be transmitted through the space network device, the Delay of the communication between the base station and the terminal is equal to a sum of the delay of the communication between the base station and the space network device and the delay of the communication between the space network device and the terminal.

According to the above-mentioned embodiment, the common_TA may be understood as twice the Delay minus the initial timing advance in the embodiment. Then, twice the Delay is a sum of twice the delay of the communication between the space network device and the terminal and twice the delay of the communication between the base station and the space network device. For example, the second distance between the terminal and the space network device is $d_2$, so the common_TA may be calculated as follows:

$$\text{common\_TA} = 2(d_{ue}+d_2)/c - 2(d_{ue}-d_i)/c = 2(d_1+d_2)/c_o$$

The common_TA in the embodiment may be known as a third round-trip transmission delay. It may be seen that the third round-trip transmission delay may be determined according to the transmission speed c and the sum of the first distance $d_1$ and the second distance $d_2$. Then, after sending the second downlink signal frame to the terminal, the base station waits for the third round-trip transmission delay $2(d_1+d_2)/c$ in a time domain, and then the received second uplink signal frame sent by the terminal corresponds to the second downlink signal frame.

Figure 6:
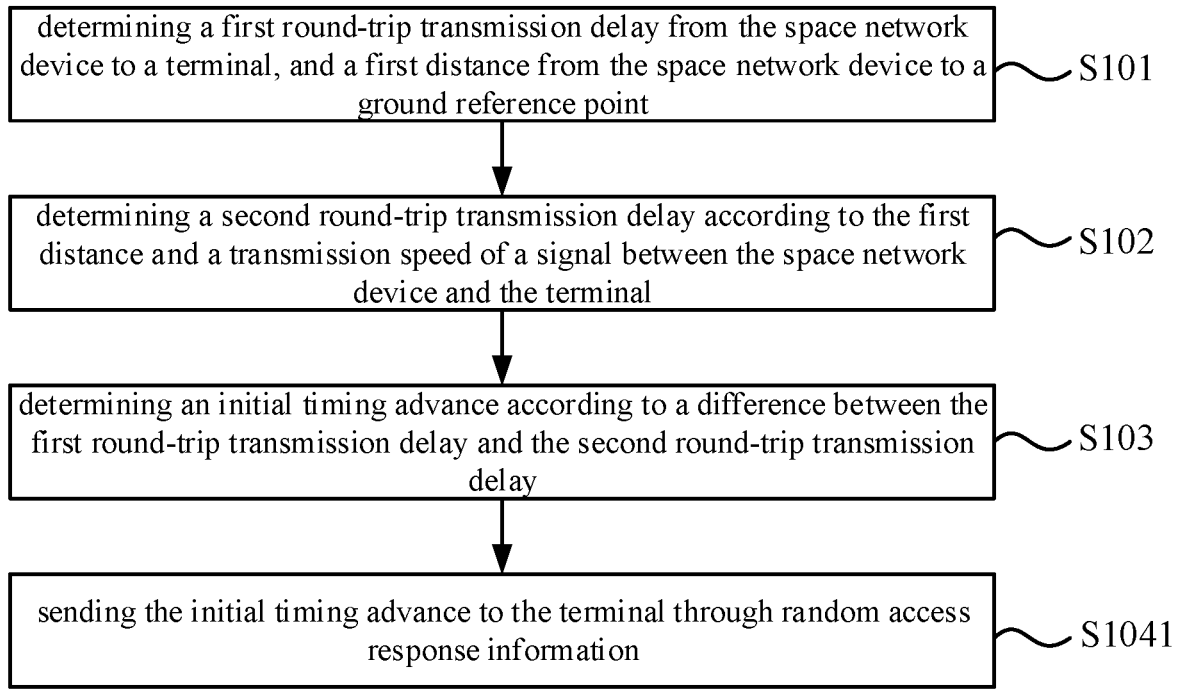
FIG. 6 is a schematic flowchart showing yet another timing advance indication method according to one or more embodiments of the present disclosure.

FIG. 6 is a schematic flowchart showing yet another timing advance indication method according to one or more embodiments of the present disclosure. As shown in FIG. 6, sending the initial timing advance to the terminal includes as follows.

In step S1041, the initial timing advance is sent to the terminal through random access response information.

In an embodiment, the initial timing advance may be sent to the terminal through the random access response (abbreviated as RAR) information.

Figure 7:
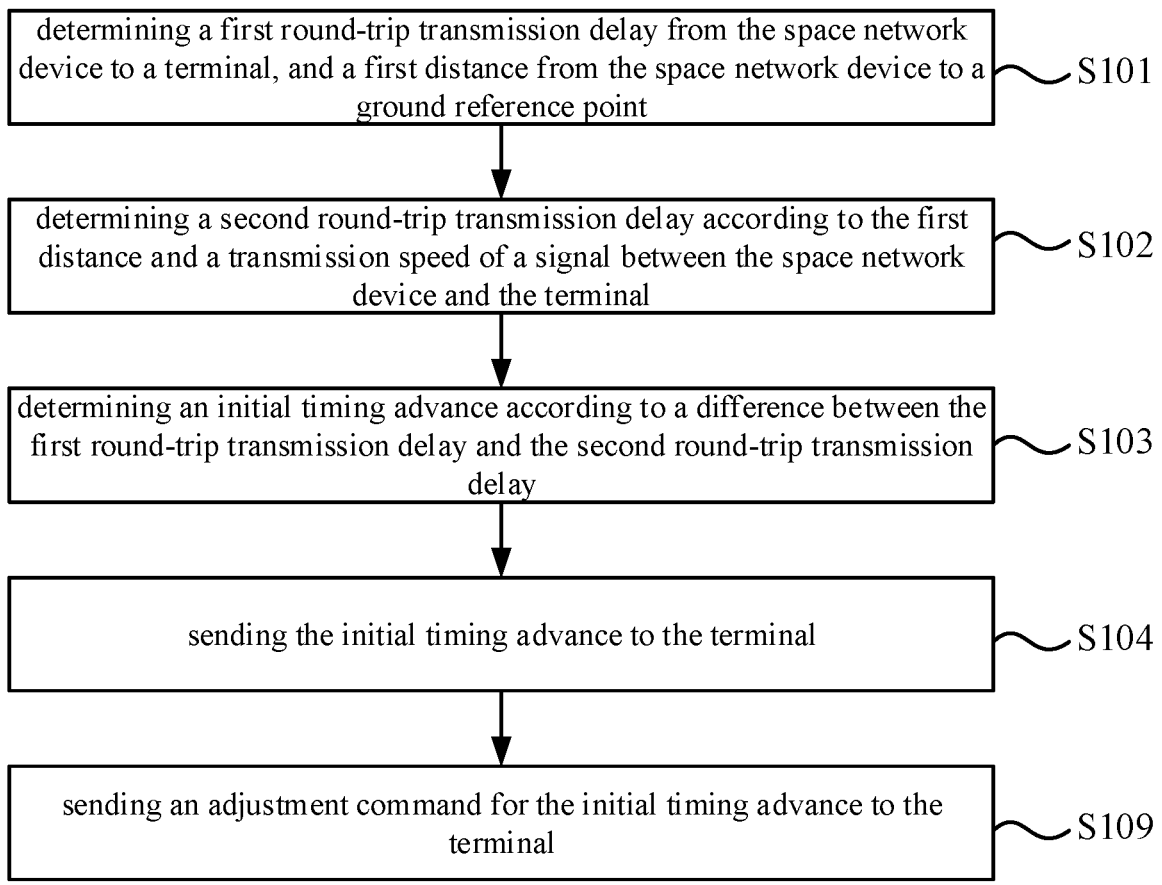
FIG. 7 is a schematic flowchart showing yet another timing advance indication method according to one or more embodiments of the present disclosure.

FIG. 7 is a schematic flowchart showing yet another timing advance indication method according to one or more embodiments of the present disclosure. As shown in FIG. 7, the method further includes as follows.

In step S109, an adjustment command for the initial timing advance is sent to the terminal.

In an embodiment, the adjustment command for the initial timing advance may also be sent to the terminal, so that the terminal can further bring forward or delay the initial timing advance, in which the adjustment command may be sent by the base station to the terminal via the non-terrestrial network device, or may also be directly sent to the terminal by the non-terrestrial network device. For example, the adjustment command may be represented by ΔT, a positive value of ΔT indicates that the initial timing advance needs to be further brought forward, and a negative value of ΔT indicates that the initial timing advance needs to be delayed.

Figure 8:
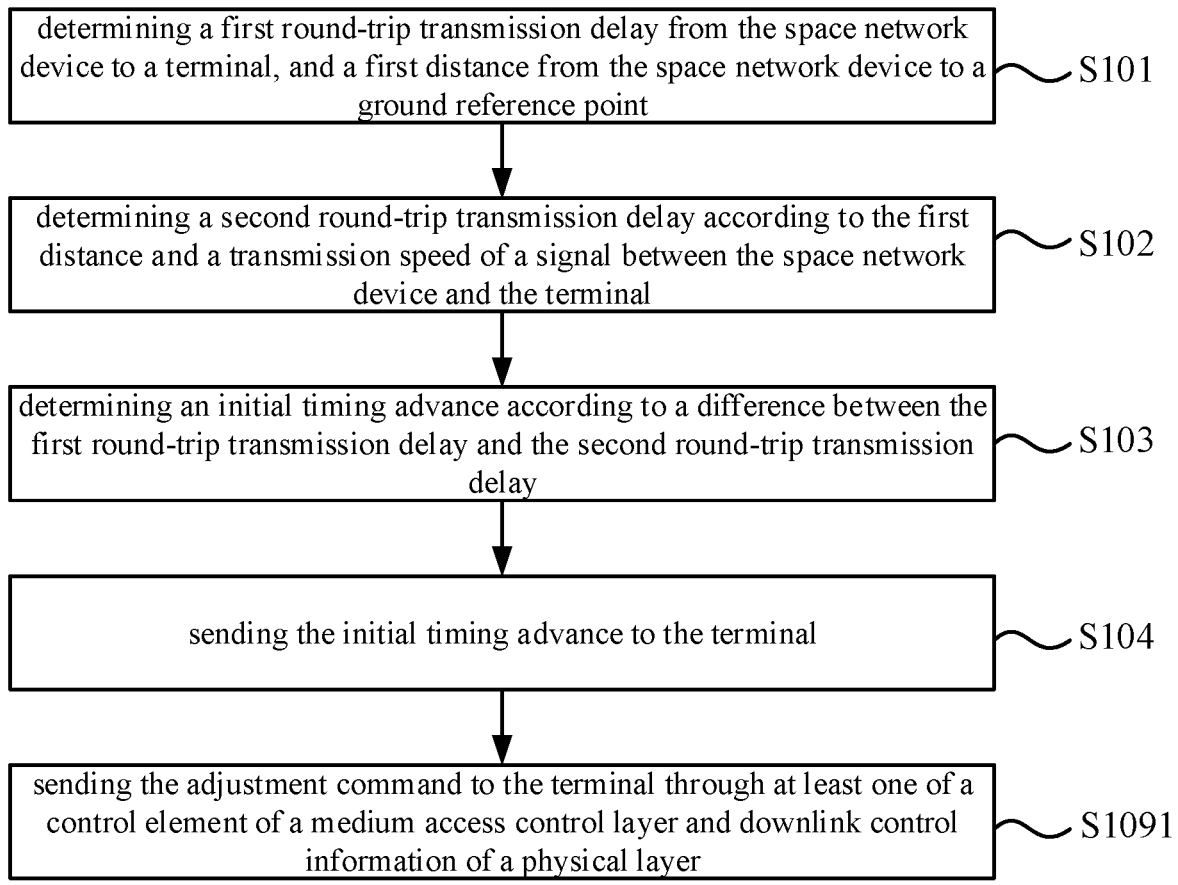
FIG. 8 is a schematic flowchart showing yet another timing advance indication method according to one or more embodiments of the present disclosure.

FIG. 8 is a schematic flowchart showing yet another timing advance indication method according to one or more embodiments of the present disclosure. As shown in FIG. 8, sending the adjustment command for the initial timing advance to the terminal includes as follows.

In step S1091, the adjustment command is sent to the terminal through at least one of a control element of a medium access control layer and downlink control information of a physical layer.

In an embodiment, the adjustment command may be sent to the terminal through at least one of the control element of the medium access control layer (MAC CE) and the downlink control information (DCI) of the physical layer.

In the related art, the adjustment command is sent to the terminal only through the control element of the medium access control layer. However, since the medium access control layer is above the physical layer, the transmission delay of the control element of the medium access control layer is larger than that of the downlink control information of the physical layer. When the signal between the terminal and the base station needs to be sent through the satellite in the non-terrestrial network, since the satellite is moving at a high speed, the delay will jitter when the signal is transmitted through the satellite. However, it is difficult to track the jitter of the delay in time because the transmission delay of the control element of the medium access control layer is large.

In short, due to the large transmission delay of the control element of the medium access control layer, the adjustment command previously determined by the base station is no longer applicable to the adjustment for the initial timing advance currently required by the terminal after sending the adjustment command to the terminal through the control element of the medium access control layer.

However, in the embodiment, the adjustment command may be sent to the terminal through the downlink control information of the physical layer. Since the transmission delay of the downlink control information of the physical layer is relatively small, it is possible to ensure that the adjustment command may be applied to the adjustment for the initial timing advance currently required by the terminal after sending it to the terminal through the downlink control information of the physical layer.

Figure 9:
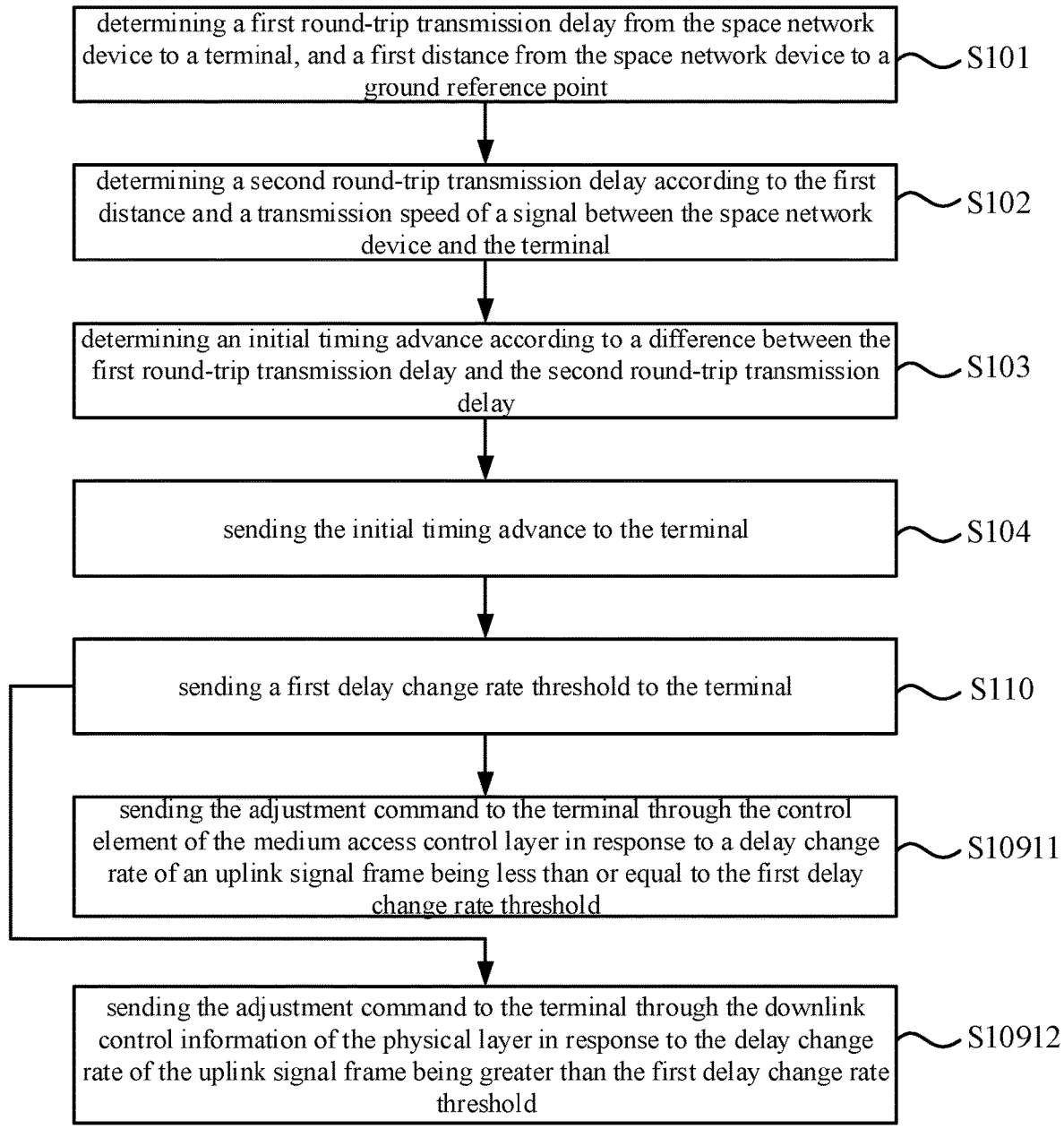
FIG. 9 is a schematic flowchart showing yet another timing advance indication method according to one or more embodiments of the present disclosure.

FIG. 9 is a schematic flowchart showing yet another timing advance indication method according to one or more embodiments of the present disclosure. As shown in FIG. 9, before sending the adjustment command to the terminal through at least one of the control element of the medium access control layer and the downlink control information of the physical layer, the method further includes as follows.

In step S110, a first delay change rate threshold is sent to the terminal. Sending the adjustment command to the terminal through at least one of the control element of the medium access control layer and the downlink control information of the physical layer includes as follows.

In step S10911, the adjustment command is sent to the terminal through the control element of the medium access control layer in response to a delay change rate of an uplink signal frame being less than or equal to the first delay change rate threshold.

In step S10912, the adjustment command is sent to the terminal through the downlink control information of the physical layer in response to the delay change rate of the uplink signal frame being greater than the first delay change rate threshold.

In an embodiment, the first delay change rate threshold may be sent to the terminal, in which the first delay change rate threshold may be sent by the base station to the terminal via the non-terrestrial network device, or directly sent by the non-terrestrial network device to the terminal.

In the case that the delay change rate of the uplink signal frame is less than or equal to the first delay change rate threshold, it may be determined that sending the adjustment command through the control element of the medium access control layer is still applicable to the adjustment for the initial timing advance currently needed by the terminal, so the adjustment command may be sent to the terminal through the control element of the medium access control layer.

Since the change rate of the uplink signal frame and the change rate of the downlink signal frame may be understood to be approximately equal, for the terminal, the terminal can acquire the adjustment command from the control element of the medium access control layer when the delay change rate of the downlink signal frame is less than or equal to the first delay change rate threshold.

However, in the case that the delay change rate of the uplink signal frame is greater than the first delay change rate threshold, it may be determined that sending the adjustment command through the control element of the medium access control layer is no longer applicable to the adjustment for the initial timing advance currently needed by the terminal, so the adjustment command may be sent to the terminal through the downlink control information of the physical layer.

Since the change rate of the uplink signal frame and the change rate of the downlink signal frame may be understood to be approximately equal, for the terminal, the terminal can acquire the adjustment command from the downlink control information of the physical layer when the delay change rate of the downlink signal frame is greater than the first delay change rate threshold.

Figure 10:
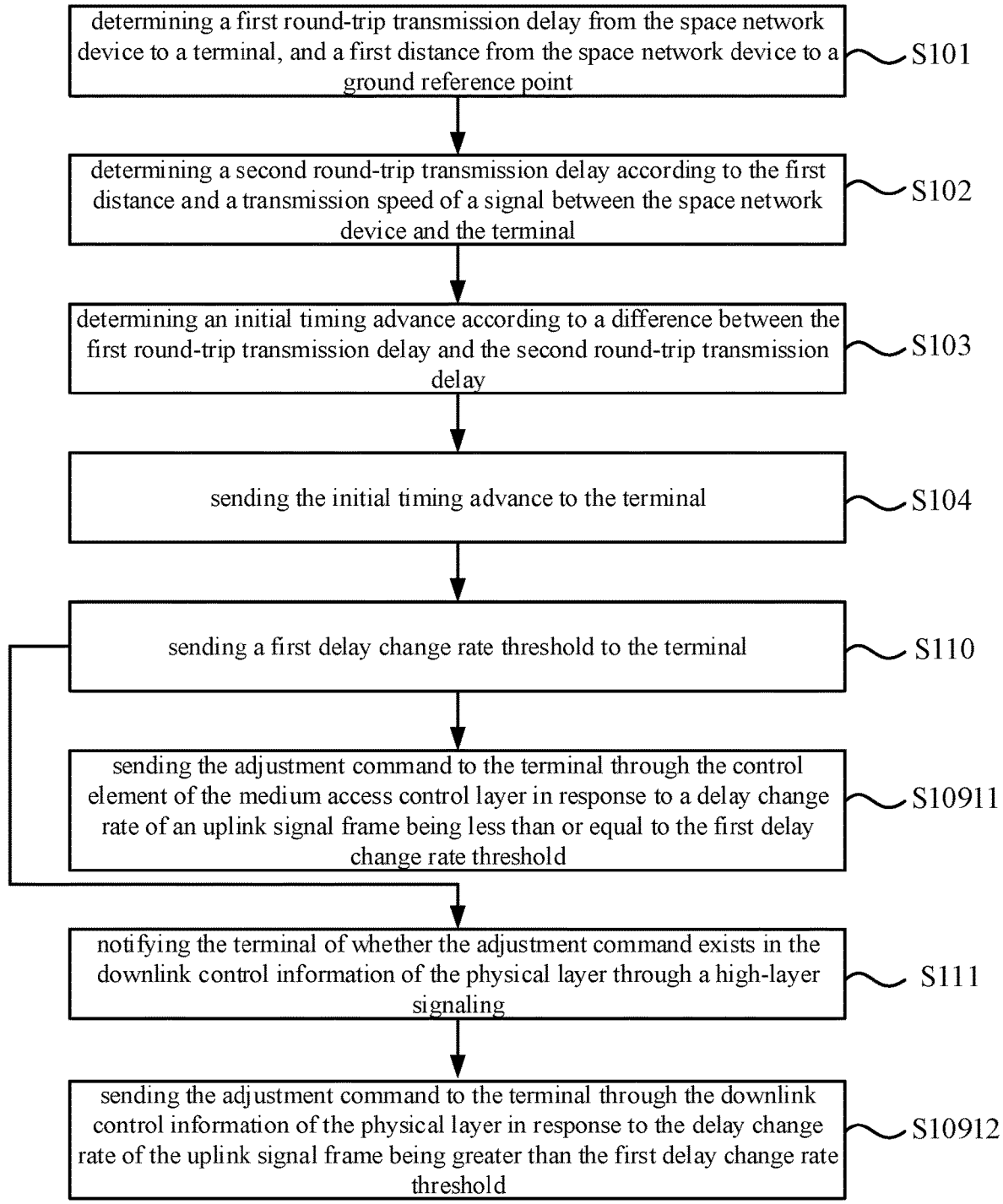
FIG. 10 is a schematic flowchart showing yet another timing advance indication method according to one or more embodiments of the present disclosure.

FIG. 10 is a schematic flowchart showing yet another timing advance indication method according to one or more embodiments of the present disclosure. As shown in FIG. 10, before sending the adjustment command to the terminal through the downlink control information of the physical layer, the method further includes as follows.

In step S111, the terminal is notified of whether the adjustment command exists in the downlink control information of the physical layer through a high-layer signaling.

In an embodiment, the high-layer signaling may refer to a medium access control layer signaling, or an unlimited resource control layer signaling. The high-layer signaling may be sent by the base station to the terminal via the non-terrestrial network device, or may be directly sent by the non-terrestrial network device to the terminal.

By notifying the terminal of whether the adjustment command exists in the downlink control information of the physical layer through the high-layer signaling, the terminal can determine whether there is an adjustment command in the downlink control information of the physical layer before attempting to acquire the adjustment command from the downlink control information of the physical layer. If the adjustment command does not exist in the downlink control information of the physical layer, it is not necessary to acquire the adjustment command from the downlink control information of the physical layer, so as to acquire wrong information as the adjustment command, which will cause the problem of a wrong adjustment. If the adjustment command exists in the downlink control information of the physical layer, the adjustment command is acquired from the downlink control information of the physical layer.

Alternatively, the space network device includes at least one of a satellite, and an aerial platform.

Figure 11:
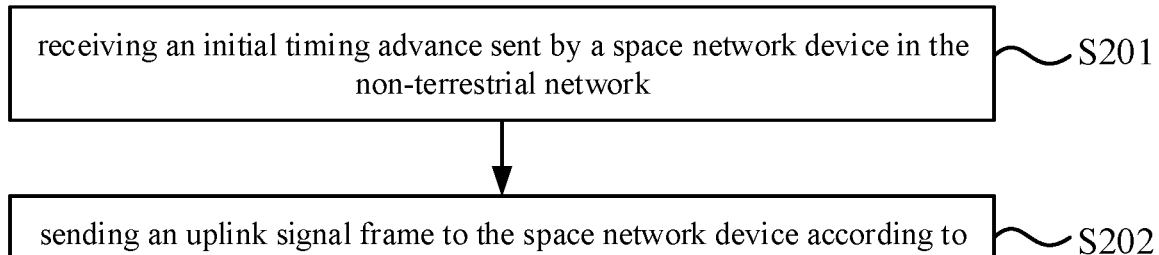
FIG. 11 is a schematic flowchart showing an uplink signal sending method according to one or more embodiments of the present disclosure.

FIG. 11 is a schematic flowchart showing an uplink signal sending method according to one or more embodiments of the present disclosure. The method shown in the embodiment may be applied to a terminal in a non-terrestrial network. The terminal includes, but is not limited to, an electronic device, such as a mobile phone, a tablet computer, a wearable device, a sensor, an Internet of Things device. The terminal can communicate with a base station through a space network device, which may be a space network device applied to the above-mentioned timing advance indication method, such as a satellite, or an aerial platform. The base stations may be a 5G base station, or a 6G base station.

As shown in FIG. 11, the uplink signal sending method may include the following steps.

In step S201, an initial timing advance sent by a space network device in the non-terrestrial network is received, in which the initial timing advance is determined based on a first round-trip transmission delay from the space network device to the terminal, a second round-trip transmission delay from the space network device to a ground reference point, and a transmission speed of a signal between the space network device and the terminal.

In step S202, an uplink signal frame is sent to the space network device according to the initial timing advance.

According to one or more embodiments of the present disclosure, the uplink signal frame may be sent by the terminal to the space network device according to the initial timing advance indicated by the space network device, in which the initial timing advance is not only determined according to the first round-trip transmission delay from the space network device to the terminal, but may be determined according to a difference between the first round-trip transmission delay and the second round-trip transmission delay. The difference is smaller relative to the first round-trip transmission delay, and therefore the number of bits which need to be occupied is also smaller, so that the number of occupied bits required to indicate the initial timing advance is also smaller, thus facilitating the saving on signaling overheads.

Figure 12:
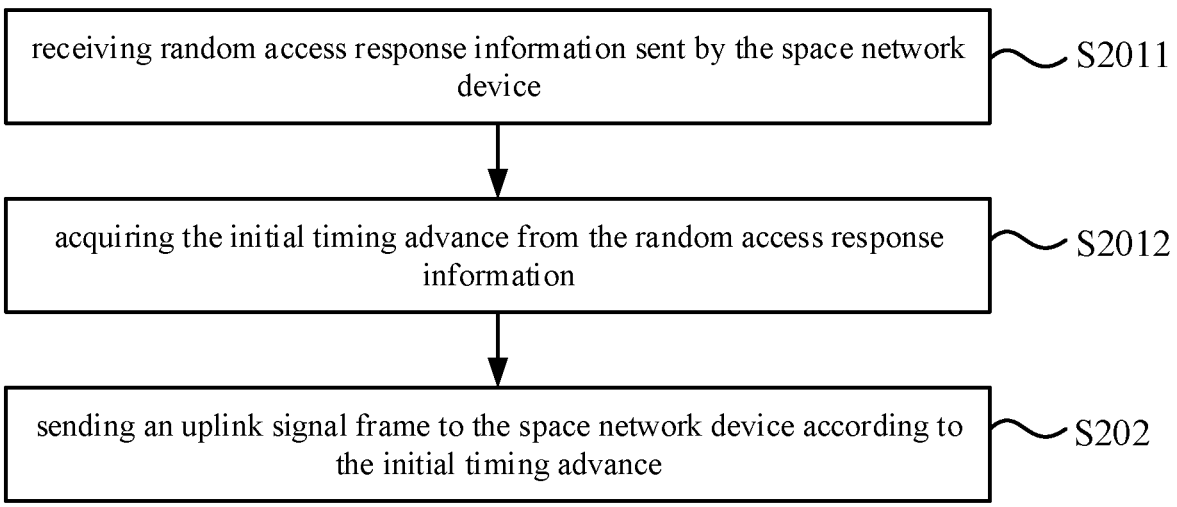
FIG. 12 is a schematic flowchart showing another uplink signal sending method according to one or more embodiments of the present disclosure.

FIG. 12 is a schematic flowchart showing another uplink signal sending method according to one or more embodiments of the present disclosure. As shown in FIG. 12, receiving the initial timing advance sent by the space network device in the non-terrestrial network includes as follows.

In step S2011, random access response information sent by the space network device is received.

In step S2012, the initial timing advance is acquired from the random access response information.

In an embodiment, the initial timing advance may be sent by the space network device to the terminal through the random access response information, and the initial timing advance may be acquired by the terminal from the random access response information received.

Figure 13:
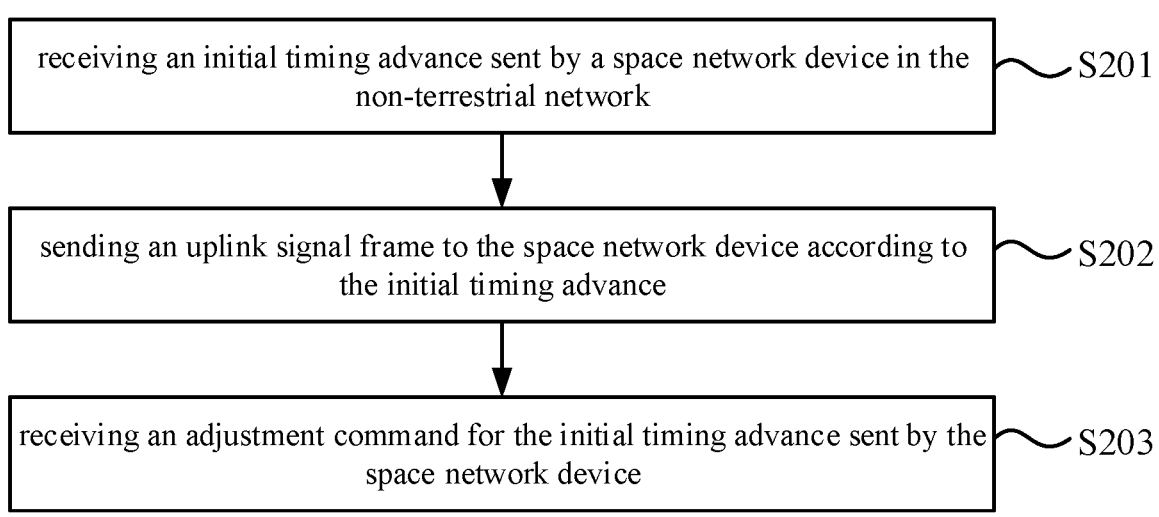
FIG. 13 is a schematic flowchart showing yet another uplink signal sending method according to one or more embodiments of the present disclosure.

FIG. 13 is a schematic flowchart showing yet another uplink signal sending method according to one or more embodiments of the present disclosure. As shown in FIG. 13, the method further includes as follows.

In step S203, an adjustment command for the initial timing advance sent by the space network device is received.

In an embodiment, the adjustment command for the initial timing advance may also be sent by the space network device to the terminal, so that the terminal can further bring forward or delay the initial timing advance, in which the adjustment command may be sent by the base station to the terminal via the space network device, or may be directly sent by the space network device to the terminal. For example, the adjustment command may be represented by $\Delta T$, a positive value of $\Delta T$ indicates that the initial timing advance needs to be further brought forward, and a negative value of $\Delta T$ indicates that the initial timing advance needs to be delayed.

Figure 14:
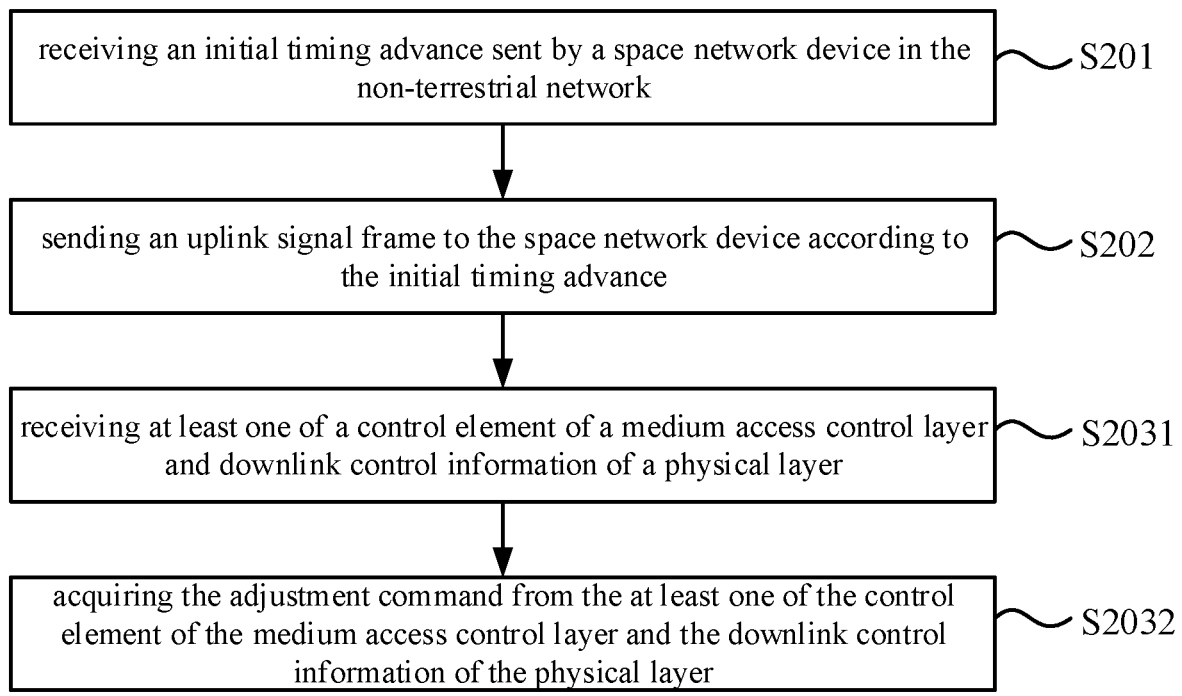
FIG. 14 is a schematic flowchart showing yet another uplink signal sending method according to one or more embodiments of the present disclosure.

FIG. 14 is a schematic flowchart showing yet another uplink signal sending method according to one or more embodiments of the present disclosure. As shown in FIG. 14, receiving the adjustment command for the initial timing advance sent by the space network device includes as follows.

In step S2031, at least one of a control element of a medium access control layer and downlink control information of a physical layer is received.

In step S2032, the adjustment command is acquired from the at least one of the control element of the medium access control layer and the downlink control information of the physical layer.

In the embodiment, the adjustment command may be sent by the space network device to the terminal through the downlink control information of the physical layer. Since the transmission delay of the downlink control information of the physical layer is relatively small, it is possible to ensure that the adjustment command may be applied to the adjustment for the initial timing advance currently required by the terminal after sending it to the terminal through the downlink control information of the physical layer.

Figure 15:
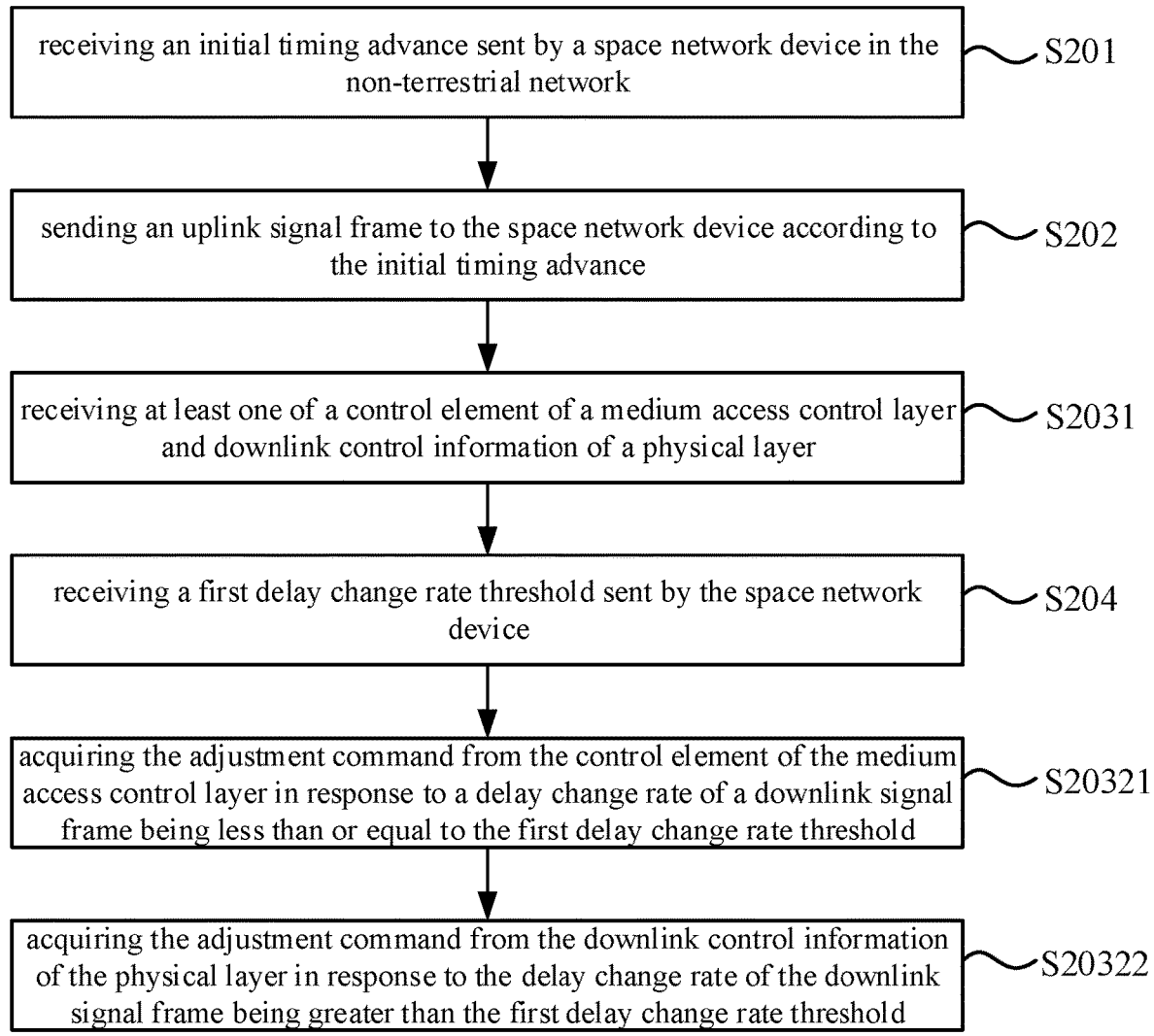
FIG. 15 is a schematic flowchart showing yet another uplink signal sending method according to one or more embodiments of the present disclosure.

FIG. 15 is a schematic flowchart showing yet another uplink signal sending method according to one or more embodiments of the present disclosure. As shown in FIG. 15, before acquiring the adjustment command from the at least one of the control element of the media access control layer and the downlink control information of the physical layer, the method further includes as follows.

In step S204, a first delay change rate threshold sent by the space network device is received. Acquiring the adjustment command from the at least one of the control element of the medium access control layer and the downlink control information of the physical layer includes as follows.

In step S20321, the adjustment command is acquired from the control element of the medium access control layer in response to a delay change rate of a downlink signal frame being less than or equal to the first delay change rate threshold.

In step S20322, the adjustment command is acquired from the downlink control information of the physical layer in response to the delay change rate of the downlink signal frame being greater than the first delay change rate threshold.

In an embodiment, the first delay change rate threshold may be sent by the space network device to the terminal, in which the first delay change rate threshold may be sent by the base station to the terminal via the space network device, or directly sent by the space network device to the terminal.

In the case that the delay change rate of the uplink signal frame is less than or equal to the first delay change rate threshold, it may be determined that sending the adjustment command through the control element of the medium access control layer is still applicable to the adjustment for the initial timing advance currently needed by the terminal, so the adjustment command may be sent to the terminal through the control element of the medium access control layer.

Since the change rate of the uplink signal frame and the change rate of the downlink signal frame may be understood to be approximately equal, for the terminal, the terminal can acquire the adjustment command from the control element of the medium access control layer when the delay change rate of the downlink signal frame is less than or equal to the first delay change rate threshold.

However, in the case that the delay change rate of the uplink signal frame is greater than the first delay change rate threshold, it may be determined that sending the adjustment command through the control element of the medium access control layer is no longer applicable to the adjustment for the initial timing advance currently needed by the terminal, so the adjustment command may be sent to the terminal through the downlink control information of the physical layer.

Since the change rate of the uplink signal frame and the change rate of the downlink signal frame may be understood to be approximately equal, for the terminal, the terminal can acquire the adjustment command from the downlink control information of the physical layer when the delay change rate of the downlink signal frame is greater than the first delay change rate threshold.

Figure 16:
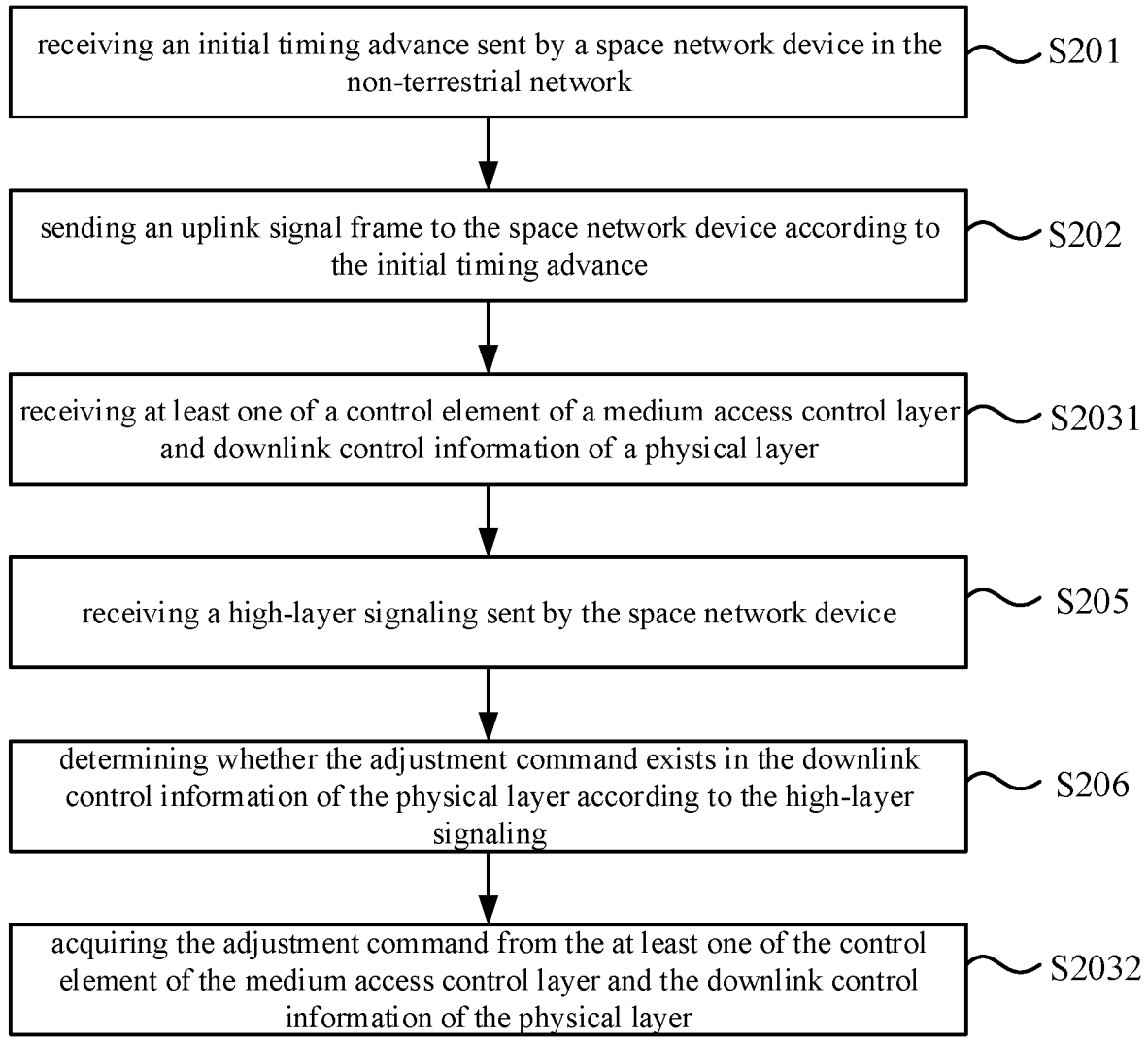
FIG. 16 is a schematic flowchart showing yet another uplink signal sending method according to one or more embodiments of the present disclosure.

FIG. 16 is a schematic flowchart showing yet another uplink signal sending method according to one or more embodiments of the present disclosure. As shown in FIG. 16, before acquiring the adjustment command from the at least one of the control element of the media access control layer and the downlink control information of the physical layer, the method further includes as follows.

In step S205, a high-layer signaling sent by the space network device is received.

In step S206, it is determined whether the adjustment command exists in the downlink control information of the physical layer according to the high-layer signaling.

In an embodiment, the terminal may determine whether the adjustment command exists in the downlink control information of the physical layer according to the high-layer signaling, so that the terminal can determine whether there is an adjustment command in the downlink control information of the physical layer before attempting to acquire the adjustment command from the downlink control information of the physical layer. If the adjustment command does not exist in the downlink control information of the physical layer, it is not necessary to acquire the adjustment command from the downlink control information of the physical layer, so as to acquire wrong information as the adjustment command, which will cause the problem of a wrong adjustment. If the adjustment command exists in the downlink control information of the physical layer, the adjustment command is acquired from the downlink control information of the physical layer.

Figure 17:
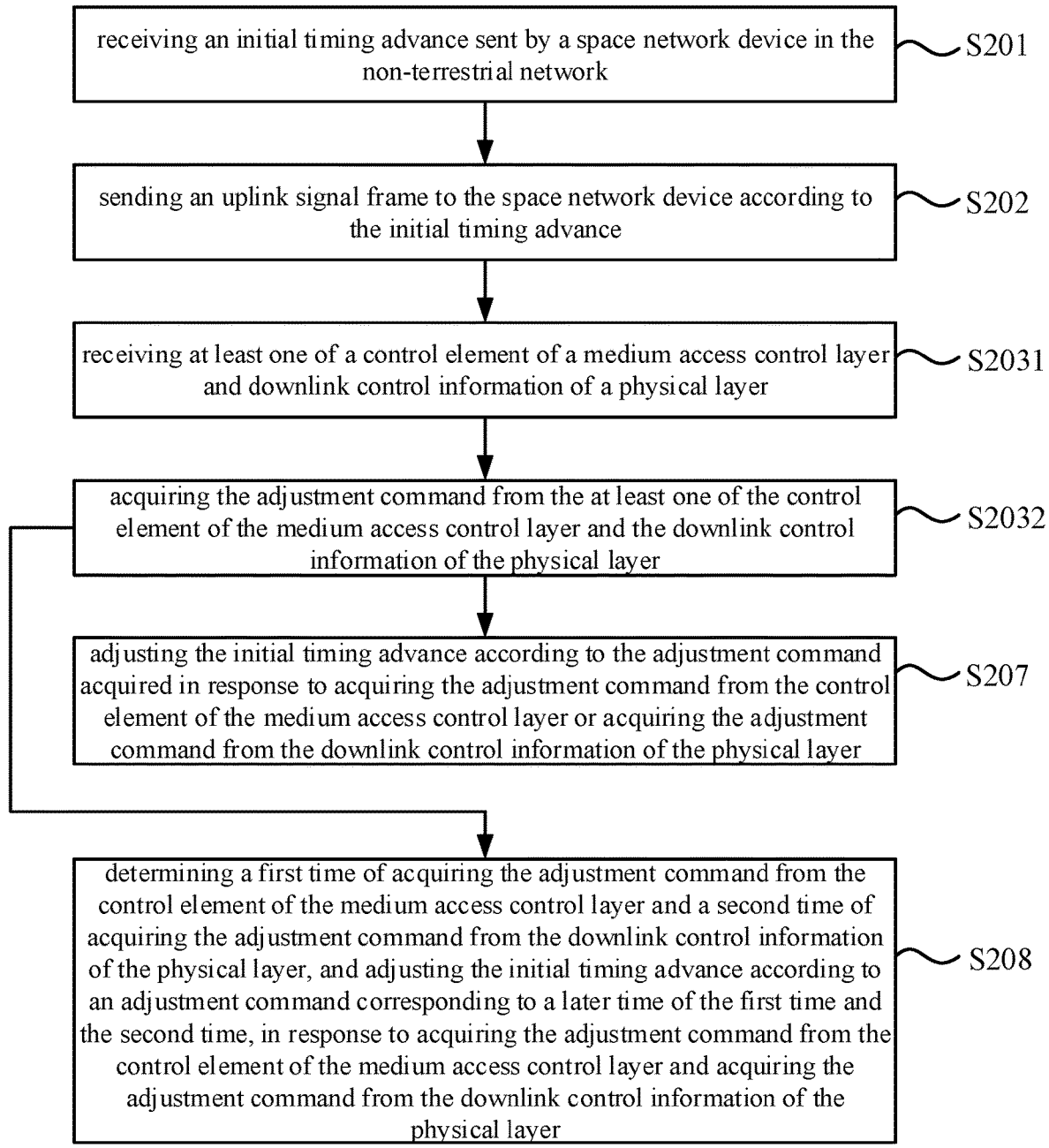
FIG. 17 is a schematic flowchart showing yet another uplink signal sending method according to one or more embodiments of the present disclosure.

FIG. 17 is a schematic flowchart showing yet another uplink signal sending method according to one or more embodiments of the present disclosure. As shown in FIG. 17, the method further includes as follows.

In step S207, the initial timing advance is adjusted according to the adjustment command acquired in response to acquiring the adjustment command from the control element of the medium access control layer or acquiring the adjustment command from the downlink control information of the physical layer.

In step S208, a first time of acquiring the adjustment command from the control element of the medium access control layer and a second time of acquiring the adjustment command from the downlink control information of the physical layer are determined, and the initial timing advance is adjusted according to an adjustment command corresponding to a later time of the first time and the second time, in response to acquiring the adjustment command from the control element of the medium access control layer and acquiring the adjustment command from the downlink control information of the physical layer.

In an embodiment, the adjustment command may be sent by the space network device to the terminal from the control element of the medium access control layer, or the adjustment command is sent to the terminal from the downlink control information of the physical layer, then the adjustment command may be acquired by the terminal from the control element of the medium access control layer, or the adjustment command is acquired from the downlink control information of the physical layer, and thus the initial timing advance is adjusted based on the acquired adjustment command.

In an embodiment, the adjustment command may also be sent by the space network device to the terminal from the control element of the medium access control layer, and the adjustment command is sent to the terminal from the downlink control information of the physical layer, then the adjustment command may be acquired by the terminal from the control element of the medium access control layer, and the adjustment command is acquired from the downlink control information of the physical layer.

In this case, the first time of acquiring the adjustment command from the control element of the medium access control layer and the second time of acquiring the adjustment command from the downlink control information of the physical layer may be determined, thus adjusting the initial timing advance according to an adjustment command corresponding to a later time of the first time and the second time. That is, an adjustment command corresponding to a time closer to a current time is selected to adjust the initial timing advance. Accordingly, it is possible to ensure that the initial timing advance adjusted according to the adjustment command is applicable to a current delay situation of the terminal.

Corresponding to the above-mentioned embodiments of the timing advance indication method and the uplink signal sending method, the present disclosure also provides embodiments of a timing advance indication apparatus and an uplink signal sending apparatus.

Figure 18:
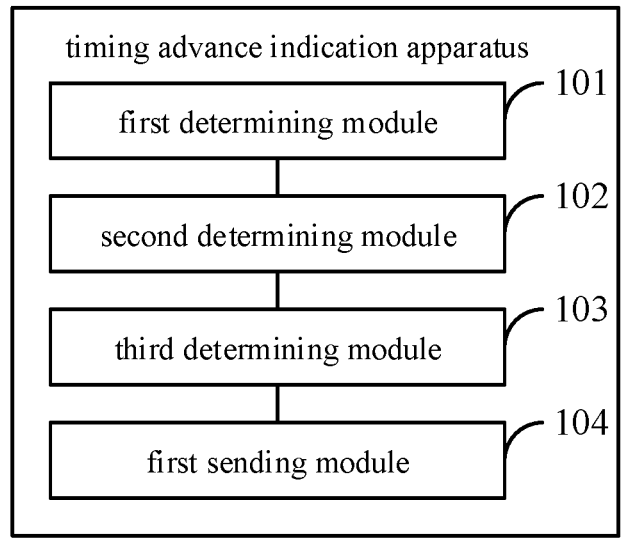
FIG. 18 is a schematic block diagram showing a timing advance indication apparatus according to one or more embodiments of the present disclosure.

FIG. 18 is a schematic block diagram showing a time advance indication apparatus according to one or more embodiments of the present disclosure. The apparatus shown in the embodiment may be applied to a space network device in a non-terrestrial network, where the space network device may be a satellite or an aerial platform. The space network device can communicate with a terminal and a base station, for example, can send information from the base station to the terminal. The terminal includes, but is not limited to, an electronic device, such as a mobile phone, a tablet computer, a wearable device, a sensor, and an Internet of Things device. The base station may be a 5G base station, or a 6G base station.

As shown in FIG. 18, the advance indication apparatus may include a first determining module 101, a second determining module 102, a third determining module 103, and a first sending module 104.

The first determining module 101 is configured to determine a first round-trip transmission delay from the space network device to a terminal, and a first distance from the space network device to a ground reference point.

The second determining module 102 is configured to determine a second round-trip transmission delay according to the first distance and a transmission speed of a signal between the space network device and the terminal.

The third determining module 103 is configured to determine an initial timing advance according to a difference between the first round-trip transmission delay and the second round-trip transmission delay.

The first sending module 104 is configured to send the initial timing advance to the terminal.

Figure 19:
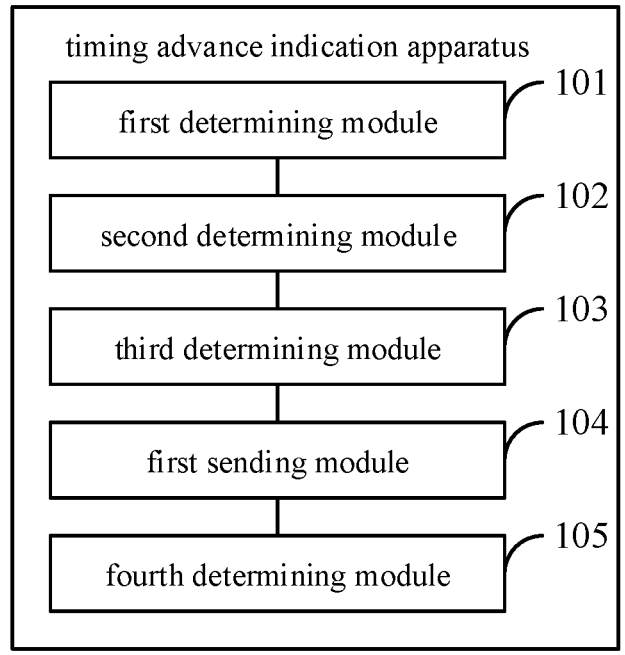
FIG. 19 is a schematic block diagram showing another timing advance indication apparatus according to one or more embodiments of the present disclosure.

FIG. 19 is a schematic block diagram showing another timing advance indication apparatus according to one or more embodiments of the present disclosure. As shown in FIG. 19, the space network device is configured to implement a function of a base station in the non-terrestrial network, and the apparatus further includes a fourth determining module 105.

The fourth determining module 105 is configured to determine a time of receiving a first uplink signal frame corresponding to a first downlink signal frame sent by the terminal according to a time of sending the first downlink signal frame and the second round-trip transmission delay after sending the first downlink signal frame to the terminal.

Figure 20:
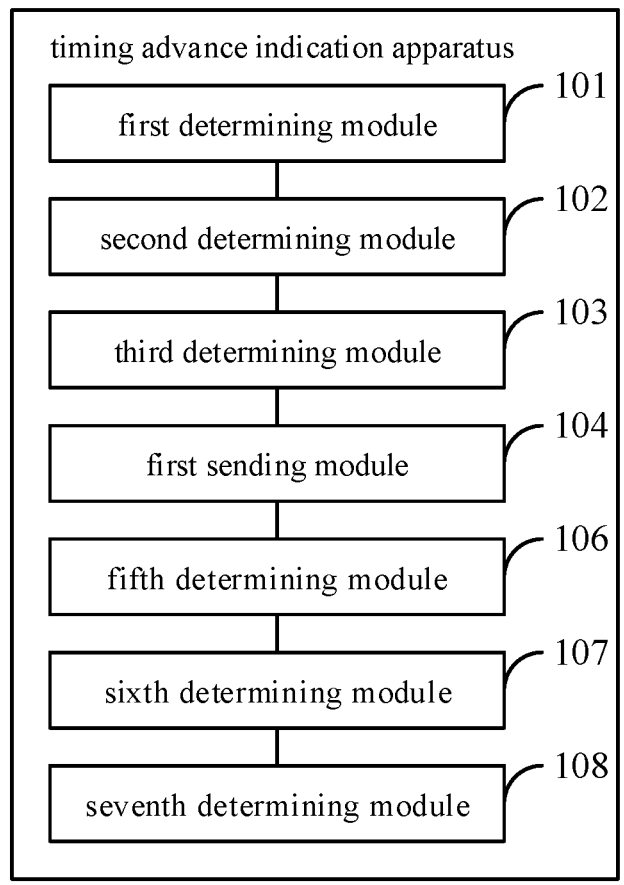
FIG. 20 is a schematic block diagram showing another timing advance indication apparatus according to one or more embodiments of the present disclosure.

FIG. 20 is a schematic block diagram showing another timing advance indication apparatus according to one or more embodiments of the present disclosure. As shown in FIG. 20, the space network device is configured to transmit information sent by a base station in the non-terrestrial network to the terminal, and the apparatus further includes a fifth determining module 106, a sixth determining module 107, and a seventh determining module 108.

The fifth determining module 106 is configured to determine a second distance from the space network device to the base station.

The sixth determining module 107 is configured to determine a third round-trip transmission delay according to the transmission speed and a sum of the first distance and the second distance.

The seventh determining module 108 is configured to determine a time of receiving a second uplink signal frame corresponding to a second downlink signal frame sent by the terminal according to the third round-trip transmission delay after sending the second downlink signal frame to the terminal.

Alternatively, the first sending module is configured to send the initial timing advance to the terminal through random access response information.

Figure 21:
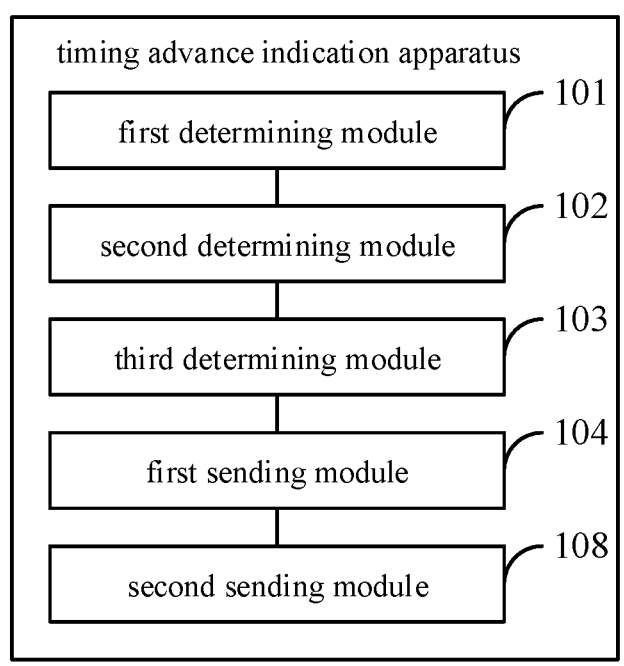
FIG. 21 is a schematic block diagram showing another timing advance indication apparatus according to one or more embodiments of the present disclosure.

FIG. 21 is a schematic block diagram showing another timing advance indication apparatus according to one or more embodiments of the present disclosure. As shown in FIG. 21, the apparatus further includes a second sending module 108.

The second sending module 108 is configured to send an adjustment command for the initial timing advance to the terminal.

Alternatively, the second sending module is configured to send the adjustment command to the terminal through at least one of a control element of a medium access control layer and downlink control information of a physical layer.

Figure 22:
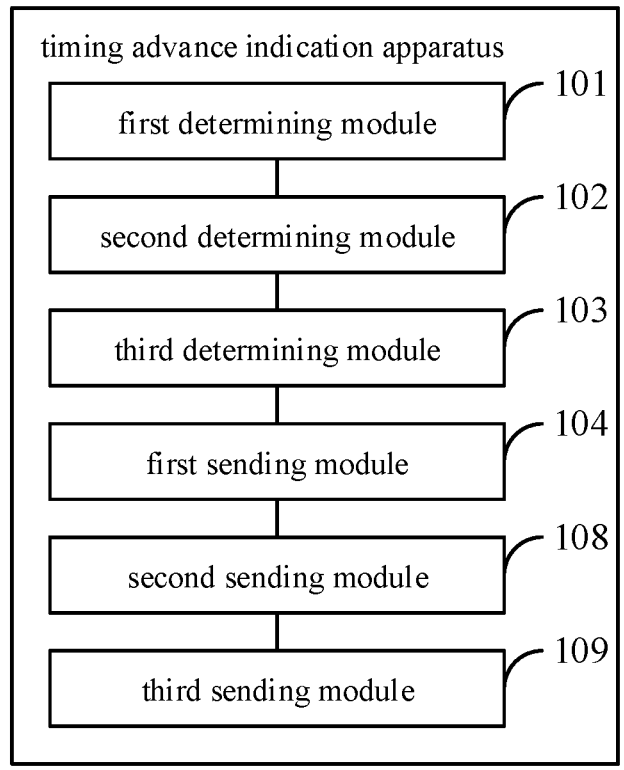
FIG. 22 is a schematic block diagram showing another timing advance indication apparatus according to one or more embodiments of the present disclosure.

FIG. 22 is a schematic block diagram showing another timing advance indication apparatus according to one or more embodiments of the present disclosure. As shown in FIG. 22, the apparatus further includes a third sending module 109.

The third sending module 109 is configured to send a first delay change rate threshold to the terminal; in which the second sending module is configured to send the adjustment command to the terminal through the control element of the medium access control layer in response to a delay change rate of an uplink signal frame being less than or equal to the first delay change rate threshold; and send the adjustment command to the terminal through the downlink control information of the physical layer in response to the delay change rate of the uplink signal frame being greater than the first delay change rate threshold.

Figure 23:
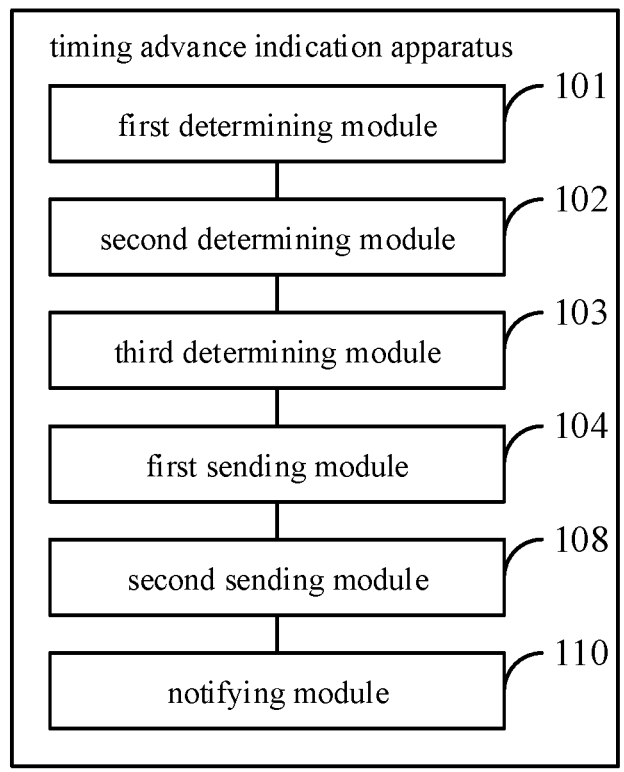
FIG. 23 is a schematic block diagram showing another timing advance indication apparatus according to one or more embodiments of the present disclosure.

FIG. 23 is a schematic block diagram showing another timing advance indication apparatus according to one or more embodiments of the present disclosure. As shown in FIG. 23, the apparatus further includes a notifying module 110.

The notifying module 110 is configured to notify the terminal of whether the adjustment command exists in the downlink control information of the physical layer through a high-layer signaling.

Alternatively, the space network device includes at least one of a satellite, and an aerial platform.

Figure 24:
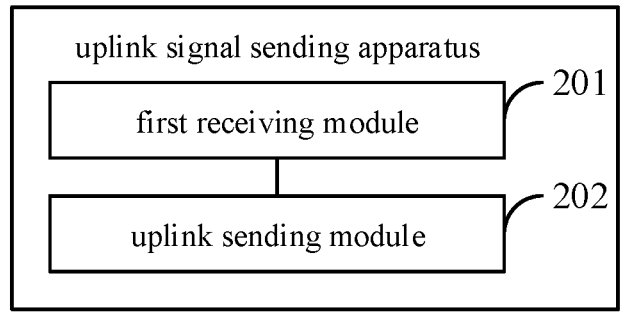
FIG. 24 is a schematic block diagram showing an uplink signal sending apparatus according to one or more embodiments of the present disclosure.

FIG. 24 is a schematic block diagram showing an uplink signal sending apparatus according to one or more embodiments of the present disclosure. The apparatus shown in the embodiment may be applied to a terminal in a non-terrestrial network. The terminal includes, but is not limited to, an electronic device, such as a mobile phone, a tablet computer, a wearable device, a sensor, and an Internet of Things device. The terminal can communicate with a base station through a space network device, which may be a space network device applied to the above-mentioned timing advance indication method, such as a satellite or an aerial platform. The base station may be a 5G base station, or a 6G base station.

As shown in FIG. 24, the uplink signal sending apparatus may include a first receiving module 201, and an uplink sending module 202.

The first receiving module 201 is configured to receive an initial timing advance sent by a space network device in the non-terrestrial network, wherein the initial timing advance is determined based on a first round-trip transmission delay from the space network device to the terminal, a second round-trip transmission delay from the space network device to a ground reference point, and a transmission speed of a signal between the space network device and the terminal.

The uplink sending module 202 is configured to send an uplink signal frame to the space network device according to the initial timing advance.

Alternatively, the first receiving module is configured to receive random access response information sent by the space network device; and acquire the initial timing advance from the random access response information.

Figure 25:
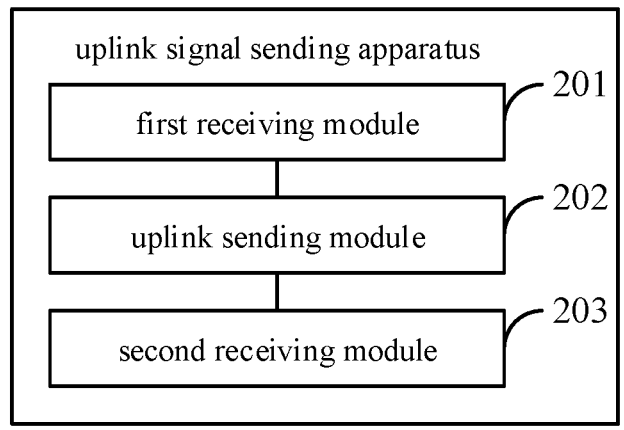
FIG. 25 is a schematic block diagram showing another uplink signal sending apparatus according to one or more embodiments of the present disclosure.

FIG. 25 is a schematic block diagram showing another uplink signal sending apparatus according to one or more embodiments of the present disclosure. As shown in FIG. 25, the apparatus further includes a second receiving module 203.

The second receiving module 203 is configured to receive an adjustment command for the initial timing advance sent by the space network device.

Alternatively, the second receiving module is configured to receive at least one of a control element of a medium access control layer and downlink control information of a physical layer; and acquire the adjustment command from the at least one of the control element of the medium access control layer and the downlink control information of the physical layer.

Figure 26:
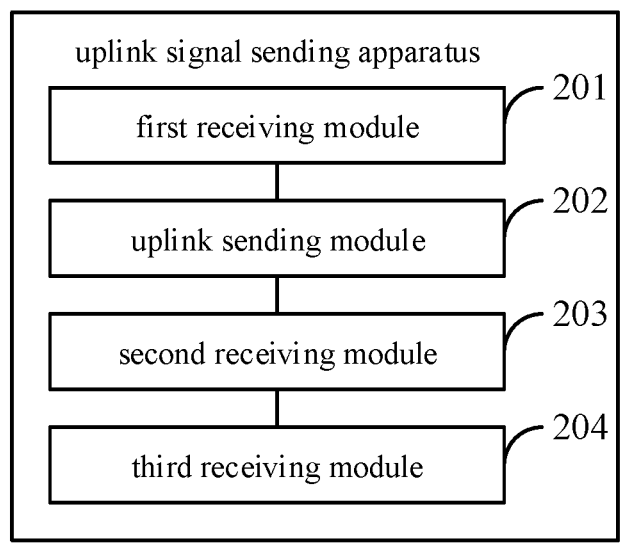
FIG. 26 is a schematic block diagram showing yet another uplink signal sending apparatus according to one or more embodiments of the present disclosure.

FIG. 26 is a schematic block diagram showing yet another uplink signal sending apparatus according to one or more embodiments of the present disclosure. As shown in FIG. 26, the apparatus further includes a third receiving module 204.

The third receiving module 204 is configured to receive a first delay change rate threshold sent by the space network device; in which the second receiving module is configured to acquire the adjustment command from the control element of the medium access control layer in response to a delay change rate of a downlink signal frame being less than or equal to the first delay change rate threshold; and acquire the adjustment command from the downlink control information of the physical layer in response to the delay change rate of the downlink signal frame being greater than the first delay change rate threshold.

Figure 27:
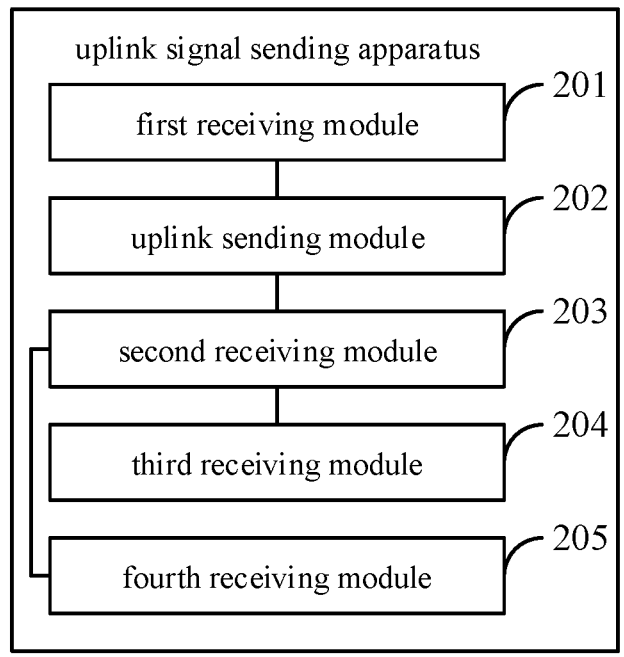
FIG. 27 is a schematic block diagram showing yet another uplink signal sending apparatus according to one or more embodiments of the present disclosure.

FIG. 27 is a schematic block diagram showing yet another uplink signal sending apparatus according to one or more embodiments of the present disclosure. As shown in FIG. 27, the apparatus further includes a fourth receiving module 205.

The fourth receiving module 205 is configured to receive a high-layer signaling sent by the space network device; and determine whether the adjustment command exists in the downlink control information of the physical layer according to the high-layer signaling.

Figure 28:
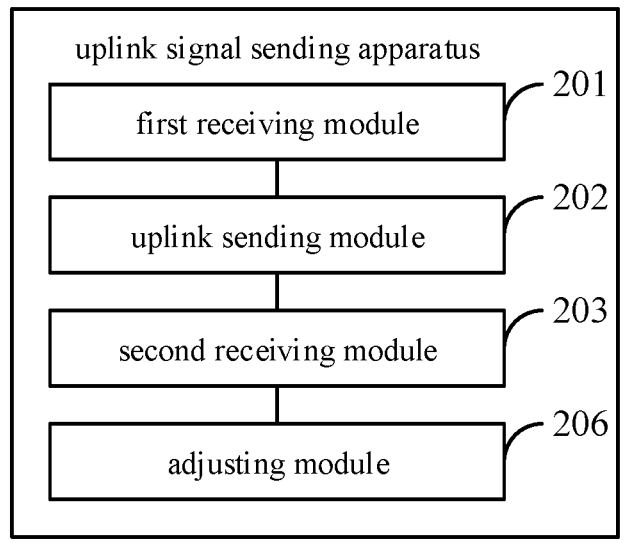
FIG. 28 is a schematic block diagram showing yet another uplink signal sending apparatus according to one or more embodiments of the present disclosure.

FIG. 28 is a schematic block diagram showing yet another uplink signal sending apparatus according to one or more embodiments of the present disclosure. As shown in FIG. 28, the apparatus further includes an adjusting module 206.

The adjusting module 206 is configured to adjust the initial timing advance according to the adjustment command acquired in response to acquiring the adjustment command from the control element of the medium access control layer or acquiring the adjustment command from the downlink control information of the physical layer; and determine a first time of acquiring the adjustment command from the control element of the medium access control layer and a second time of acquiring the adjustment command from the downlink control information of the physical layer, and adjust the initial timing advance according to an adjustment command corresponding to a later time of the first time and the second time, in response to acquiring the adjustment command from the control element of the medium access control layer and acquiring the adjustment command from the downlink control information of the physical layer.

With respect to the apparatus in the above-mentioned embodiments, the specific manners for performing operations for individual modules therein have been described in detail in the embodiments regarding the methods, which will not be elaborated herein.

Since the apparatus embodiments substantially correspond to the method embodiments, reference is made to the partial description of the method embodiments. The above-described device embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and executable by those skilled in the art without creative efforts.

An embodiment of the present disclosure also provides an electronic device, including a processor; and a memory for storing instructions executable by the processor; in which the processor is configured to implement the timing advance indication method described in any of the above-mentioned embodiments, and/or the uplink signal sending method described in any of the above-mentioned embodiments.

An embodiment of the present disclosure further provides a computer-readable storage medium having stored therein a computer program that, when executed by a processor, causes the processor to implement steps of the timing advance indication method described in any of the above-mentioned embodiments, and/or steps of the uplink signal sending method described in any of the above-mentioned embodiments.

Figure 29:
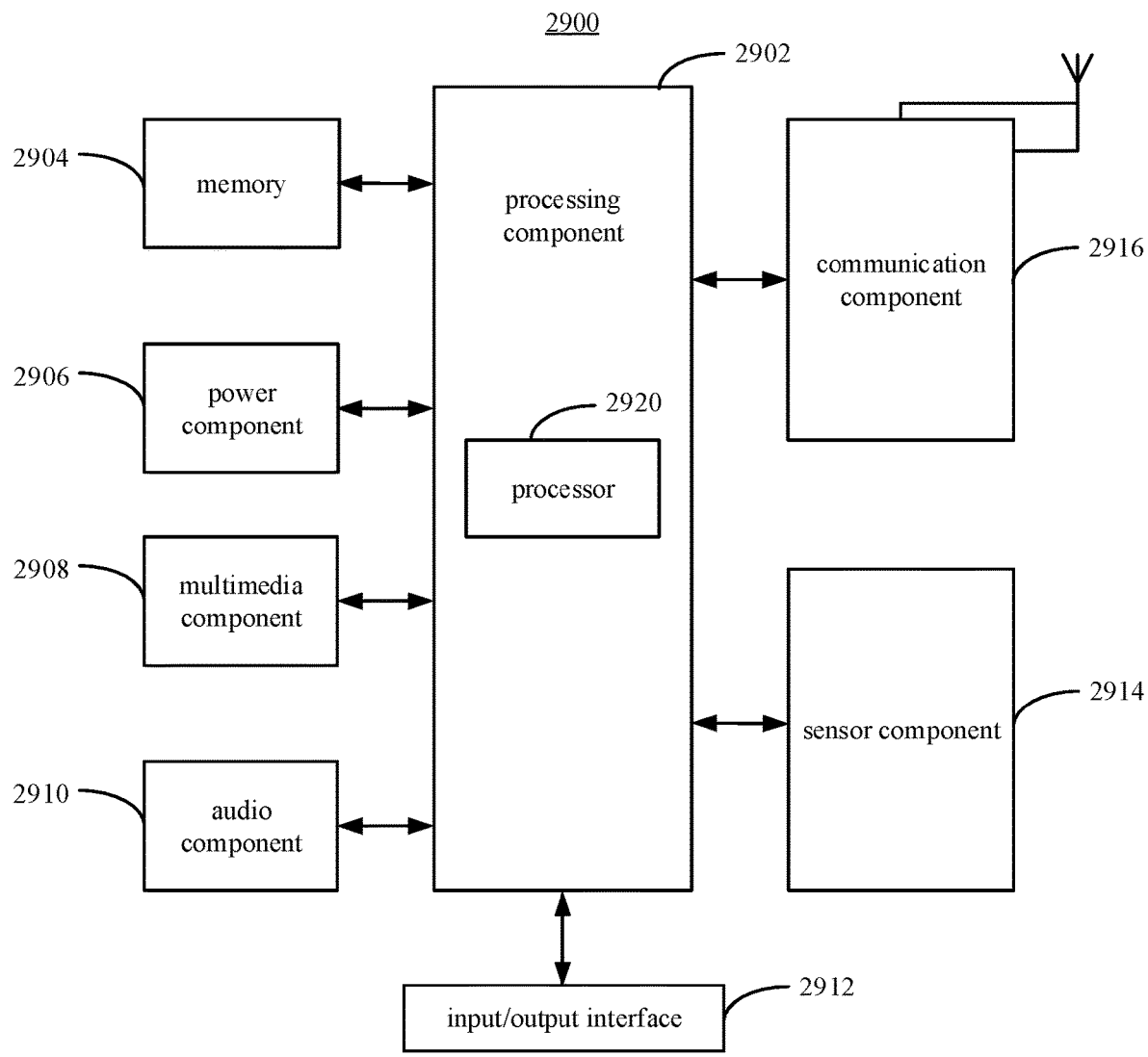
FIG. 29 is a schematic block diagram showing an apparatus for uplink signal sending according to one or more embodiments of the present disclosure.

FIG. 29 is a schematic block diagram showing an apparatus 2900 for uplink signal sending according to one or more embodiments of the present disclosure. For example, the apparatus 2900 may be a mobile phone, a computer, a digital broadcast terminal, a messaging device, a game console, a tablet device, a medical device, a fitness device, a personal digital assistant, or the like.

Referring to FIG. 29, the apparatus 2900 may include one or more of the following components: a processing component 2902, a memory 2904, a power component 2906, a multimedia component 2908, an audio component 2910, an input/output (I/O) interface 2912, a sensor component 2914, and a communication component 2916.

The processing component 2902 typically controls overall operations of the apparatus 2900, such as the operations associated with display, phone calls, data communications, camera operations, and recording operations. The processing component 2902 can include one or more processors 2920 to execute instructions to perform all or some of the steps in the above-described uplink signal sending methods. Moreover, the processing component 2902 may include one or more modules which facilitate the interaction between the processing component 2902 and other components. For instance, the processing component 2902 may include a multimedia module to facilitate the interaction between the multimedia component 2908 and the processing component 2902.

The memory 2904 is configured to store various types of data to support the operation of the apparatus 2900. Examples of such data include instructions for any applications or methods operated on the apparatus 2900, contact data, phonebook data, messages, pictures, videos, etc. The memory 2904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2906 provides power to various components of the apparatus 2900. The power component 2906 may include a power management system, one or more power sources, and any other components associated with the generation, management, and distribution of power in the apparatus 2900.

The multimedia component 2908 includes a screen providing an output interface between the apparatus 2900 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 2908 includes a front camera and/or a rear camera. The front camera and/or the rear camera may receive an external multimedia datum while the apparatus 2900 is in an operation mode, such as a photographing mode or a video mode. Each of the front camera and the rear camera may be a fixed optical lens system or have focus and optical zoom capability.

The audio component 2910 is configured to output and/or input audio signals. For example, the audio component 2910 includes a microphone (MIC) configured to receive an external audio signal when the apparatus 2900 is in an operation mode, such as a call mode, a recording mode, and a voice recognition mode. The received audio signal may be further stored in the memory 2904 or transmitted via the communication component 2916. In some embodiments, the audio component 2910 further includes a speaker to output audio signals.

The I/O interface 2912 provides an interface between the processing component 2902 and peripheral interface modules, such as keyboards, click wheels, buttons, and the like. The buttons may include, but are not limited to, a home button, a volume button, a starting button, and a locking button.

The sensor component 2914 includes one or more sensors to provide status assessments of various aspects of the apparatus 2900. For instance, the sensor component 2914 may detect an open/closed status of the apparatus 2900, relative positioning of components, e.g., the display and the keypad, of the apparatus 2900, a change in position of the apparatus 2900 or an component of the apparatus 2900, a presence or absence of user contact with the apparatus 2900, an orientation or an acceleration/deceleration of the apparatus 2900, and a change in temperature of the apparatus 2900. The sensor component 2914 may include a proximity sensor configured to detect the presence of nearby objects without any physical contact. The sensor component 2914 may include a light sensor, such as a CMOS or CCD image sensor, for use in imaging applications. In some embodiments, the sensor component 2914 may further include an accelerometer sensor, a gyroscope sensor, a magnetic sensor, a pressure sensor, or a temperature sensor.

The communication component 2916 is configured to facilitate communication, wired or wireless, between the apparatus 2900 and other devices. The apparatus 2900 can access a wireless network based on a communication standard, such as WiFi, 2G, or 3G, 4G LTE, 5G NR or a combination thereof. In an illustrative embodiment, the communication component 2916 receives a broadcast signal or broadcast associated information from an external broadcast management system via a broadcast channel. In an illustrative embodiment, the communication component 2916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 2900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-mentioned uplink signal sending method.

In an illustrative embodiment, there is also provided a non-transitory computer readable storage medium including instructions, such as included in the memory 2904, executable by the processor 2920 in the apparatus 2900, for completing the above-mentioned uplink signal sending method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the embodiments of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and apparatuses provided by the embodiments of the present disclosure have been described in detail above, and specific examples are used to illustrate the principle and implementation of the present disclosure. The description of the above embodiments is only used to help understand the methods and core ideas of the present disclosure. At the same time, for those skilled in the art, there will be some changes in the specific implementation and application scope according to the idea of the present disclosure. In summary, the content of the specification should not be construed as a limitation to the present disclosure.

What is claimed is:

1. A timing advance indication method, comprising:
   determining, by a space network device in a non-terrestrial network, a first round-trip transmission delay from the space network device to a terminal, and a first distance from the space network device to a ground reference point;
   determining, by the space network device in the non-terrestrial network, a second round-trip transmission delay according to the first distance and a transmission speed of a signal between the space network device and the terminal;
   determining, by the space network device in the non-terrestrial network, an initial timing advance according to a difference between the first round-trip transmission delay and the second round-trip transmission delay; and
   sending, by the space network device in the non-terrestrial network, the initial timing advance to the terminal.

2. The method of claim 1, wherein the space network device is configured to implement a function of a base station in the non-terrestrial network, and the method further comprises:
   determining, by the space network device in the non-terrestrial network, a time of receiving a first uplink signal frame corresponding to a first downlink signal frame sent by the terminal according to a time of sending the first downlink signal frame and the second round-trip transmission delay after sending the first downlink signal frame to the terminal.

3. The method of claim 1, wherein the space network device is configured to transmit information sent by a base station in the non-terrestrial network to the terminal, and the method further comprises:
   determining, by the space network device in the non-terrestrial network, a second distance from the space network device to the base station;
   determining, by the space network device in the non-terrestrial network, a third round-trip transmission delay according to the transmission speed and a sum of the first distance and the second distance; and
   determining, by the space network device in the non-terrestrial network, a time of receiving a second uplink signal frame corresponding to a second downlink signal frame sent by the terminal according to the third round-trip transmission delay after sending the second downlink signal frame to the terminal.

4. The method of claim 1, wherein sending the initial timing advance to the terminal comprises:
   sending, by the space network device in the non-terrestrial network, the initial timing advance to the terminal through random access response information.

5. The method of claim 1, further comprising:
   sending, by the space network device in the non-terrestrial network, an adjustment command for the initial timing advance to the terminal.

6. The method of claim 5, wherein sending the adjustment command for the initial timing advance to the terminal comprises:
   sending, by the space network device in the non-terrestrial network, the adjustment command to the terminal through at least one of a control element of a medium access control layer and downlink control information of a physical layer.

7. The method of claim 6, before sending the adjustment command to the terminal through at least one of the control element of the medium access control layer and the downlink control information of the physical layer, further comprising:
   sending, by the space network device in the non-terrestrial network, a first delay change rate threshold to the terminal;
   wherein sending the adjustment command to the terminal through at least one of the control element of the medium access control layer and the downlink control information of the physical layer comprises:
   sending, by the space network device in the non-terrestrial network, the adjustment command to the terminal through the control element of the medium access control layer in response to a delay change rate of an uplink signal frame being less than or equal to the first delay change rate threshold; and
   sending, by the space network device in the non-terrestrial network, the adjustment command to the terminal through the downlink control information of the physical layer in response to the delay change rate of the uplink signal frame being greater than the first delay change rate threshold.

8. The method of claim 6, before sending the adjustment command to the terminal through the downlink control information of the physical layer, further comprising:
   notifying, by the space network device in the non-terrestrial network, the terminal of whether the adjustment command exists in the downlink control information of the physical layer through a high-layer signaling.

9. The method of claim 1, wherein the space network device comprises at least one of: a satellite, and an aerial platform.

10. An uplink signal sending method, comprising:
    receiving, by a terminal in a non-terrestrial network, an initial timing advance sent by a space network device in the non-terrestrial network, wherein the initial timing advance is determined based on a first round-trip transmission delay from the space network device to the terminal, a second round-trip transmission delay from the space network device to a ground reference point, and a transmission speed of a signal between the space network device and the terminal; and sending, by the terminal in the non-terrestrial network, an uplink signal frame to the space network device according to the initial timing advance.

11. The method of claim 10, wherein receiving the initial timing advance sent by the space network device in the non-terrestrial network comprises:

receiving, by the terminal in the non-terrestrial network, random access response information sent by the space network device; and acquiring, by the terminal in the non-terrestrial network, the initial timing advance from the random access response information.

12. The method of claim 10, further comprising:

receiving, by the terminal in the non-terrestrial network, an adjustment command for the initial timing advance sent by the space network device.

13. The method of claim 12, wherein receiving the adjustment command for the initial timing advance sent by the space network device comprises:

receiving, by the terminal in the non-terrestrial network, at least one of a control element of a medium access control layer and downlink control information of a physical layer; and acquiring, by the terminal in the non-terrestrial network, the adjustment command from the at least one of the control element of the medium access control layer and the downlink control information of the physical layer.

14. The method of claim 13, before acquiring the adjustment command from the at least one of the control element of the medium access control layer and the downlink control information of the physical layer, further comprising:

receiving, by the terminal in the non-terrestrial network, a first delay change rate threshold sent by the space network device;

wherein acquiring the adjustment command from the at least one of the control element of the medium access control layer and the downlink control information of the physical layer comprises:

acquiring, by the terminal in the non-terrestrial network, the adjustment command from the control element of the medium access control layer in response to a delay change rate of a downlink signal frame being less than or equal to the first delay change rate threshold; and acquiring, by the terminal in the non-terrestrial network, the adjustment command from the downlink control information of the physical layer in response to the delay change rate of the downlink signal frame being greater than the first delay change rate threshold.

15. The method of claim 13, before acquiring the adjustment command from the at least one of the control element of the media access control layer and the downlink control information of the physical layer, further comprising:

receiving, by the terminal in the non-terrestrial network, a high-layer signaling sent by the space network device; and determining, by the terminal in the non-terrestrial network, whether the adjustment command exists in the downlink control information of the physical layer according to the high-layer signaling.

16. The method of claim 13, further comprising:

adjusting, by the terminal in the non-terrestrial network, the initial timing advance according to the adjustment command acquired in response to acquiring the adjustment command from the control element of the medium access control layer or acquiring the adjustment command from the downlink control information of the physical layer; and determining, by the terminal in the non-terrestrial network, a first time of acquiring the adjustment command from the control element of the medium access control layer and a second time of acquiring the adjustment command from the downlink control information of the physical layer, and adjusting the initial timing advance according to an adjustment command corresponding to a later time of the first time and the second time, in response to acquiring the adjustment command from the control element of the medium access control layer and acquiring the adjustment command from the downlink control information of the physical layer.

17. An electronic device, comprising:

at least one processor; and a memory for storing instructions executable by the at least one processor;

wherein the at least one processor is configured to:
determine a first round-trip transmission delay from a space network device to a terminal, and a first distance from the space network device to a ground reference point;
determine a second round-trip transmission delay according to the first distance and a transmission speed of a signal between the space network device and the terminal;
determine an initial timing advance according to a difference between the first round-trip transmission delay and the second round-trip transmission delay; and
send the initial timing advance to the terminal.

18. The electronic device of claim 17, wherein the at least one processor is configured to:
determine a time of receiving a first uplink signal frame corresponding to a first downlink signal frame sent by the terminal according to a time of sending the first downlink signal frame and the second round-trip transmission delay after sending the first downlink signal frame to the terminal.

19. The electronic device of claim 17, wherein the at least one processor is configured to:
determine a second distance from the space network device to the base station;
determine a third round-trip transmission delay according to the transmission speed and a sum of the first distance and the second distance; and
determine a time of receiving a second uplink signal frame corresponding to a second downlink signal frame sent by the terminal according to the third round-trip transmission delay after sending the second downlink signal frame to the terminal.

20. The electronic device of claim 17, wherein the at least one processor is configured to:
send the initial timing advance to the terminal through random access response information.

* * * * *